(12) United States Patent
Sakon et al.

(10) Patent No.: US 7,151,067 B2
(45) Date of Patent: Dec. 19, 2006

(54) PORCELAIN COMPOSITION, COMPOSITE MATERIAL COMPRISING CATALYST AND CERAMIC, FILM REACTOR, METHOD FOR PRODUCING SYNTHETIC GAS, APPARATUS FOR PRODUCING SYNTHETIC GAS AND METHOD FOR ACTIVATING CATALYST

(75) Inventors: Tadashi Sakon, Chiba (JP); Wataru Ito, Chiba (JP); Hitoshi Dohnomae, Chiba (JP); Toru Nagai, Chiba (JP); Hideki Kurimura, Tokyo (JP); Shouichi Kaganoi, Tokyo (JP); Youhei Suzuki, Tokyo (JP); Takashi Ito, Tokyo (JP)

(73) Assignees: Nippon Steel Corporation, Tokyo (JP); Teikoku Oil Co., Ltd., Tokyo (JP)

( * ) Notice: Subject to any disclaimer, the term of this patent is extended or adjusted under 35 U.S.C. 154(b) by 210 days.

(21) Appl. No.: 10/492,635

(22) PCT Filed: Oct. 11, 2002

(86) PCT No.: PCT/JP02/10577

§ 371 (c)(1),
(2), (4) Date: Apr. 14, 2004

(87) PCT Pub. No.: WO03/033431

PCT Pub. Date: Apr. 24, 2003

(65) Prior Publication Data

US 2004/0242413 A1 Dec. 2, 2004

(30) Foreign Application Priority Data

| Oct. 15, 2001 | (JP) | ............................. 2001-316661 |
| Oct. 15, 2001 | (JP) | ............................. 2001-316663 |
| Nov. 1, 2001 | (JP) | ............................. 2001-336723 |

(51) Int. Cl.
*C04B 35/01* (2006.01)
*C01B 3/02* (2006.01)
*B01J 23/02* (2006.01)
*B01J 12/00* (2006.01)

(52) U.S. Cl. ...................... 501/123; 501/108; 501/126; 501/127; 501/132; 501/152; 501/135; 501/136; 501/137; 501/138; 501/139; 502/300; 502/324; 502/325; 502/340; 502/527.12; 502/527.13; 502/525; 96/4; 96/11; 423/651; 423/652; 423/418.2; 252/373; 422/129; 422/211; 428/699; 428/701; 428/697; 428/702

(58) Field of Classification Search ................ 501/123, 501/126, 152, 135, 136, 137, 138, 139, 108, 501/127, 132; 502/325, 300, 324, 340, 527.12, 502/527.13, 525, 20, 34; 96/4, 11; 423/651, 423/652, 418.2; 252/373; 422/129, 211; 428/699, 701, 697, 702

See application file for complete search history.

(56) References Cited

U.S. PATENT DOCUMENTS

| 6,033,632 A | | 3/2000 | Schwartz et al. ........... 422/190 |
| 6,150,290 A | * | 11/2000 | Christiansen et al. ....... 501/152 |
| 6,875,528 B1 | * | 4/2005 | Nagai et al. ................. 428/701 |
| 2001/0003232 A1 | * | 6/2001 | Kleefisch et al. .......... 48/198.2 |

FOREIGN PATENT DOCUMENTS

| EP | 1 095 914 | 5/2001 |
| JP | 56-92103 | 7/1981 |
| JP | 61-21717 | 1/1986 |
| JP | 02-258063 | 10/1990 |
| JP | 02-261541 | 10/1990 |
| JP | 05-184930 | 7/1993 |
| JP | 06-056428 | 3/1994 |
| JP | 06-088080 | 3/1994 |
| JP | 06-206706 | 7/1994 |
| JP | 07-240115 | 9/1995 |
| JP | 2000-251535 | 9/2000 |
| JP | 2000-288394 | 10/2000 |

| JP | 2001-097789 | 4/2001 |
| JP | 2002-085946 | 3/2002 |
| WO | WO 98/41394 | 9/1998 |
| WO | WO 99/21649 | 5/1999 |
| WO | WO 01/41924 | 6/2001 |

OTHER PUBLICATIONS

Y. Teraoka et al.: Chemistry Letters, pp. 503-506, 1988.
Perovskite related compounds, Kikan Kagaku Sosetsu, No. 32 (1997), pp. 11-13, edited by Chemical Society of Japan.
A. J. Jacobson et al.: J. Solid State Chemistry, vol. 35, (1980) pp. 334-340.
H. W. Brinkman et al.: Solid State Ionics, vol. 68, (1994) pp. 173-176.
Solid State Ionics, vol. 124 (1999) pp. 61-72.
Journal of Power Sources, 1981, vol. 6, pp. 121-142.

* cited by examiner

*Primary Examiner*—Timothy C. Vanoy
(74) *Attorney, Agent, or Firm*—Kenyon & Kenyon LLP

(57) ABSTRACT

A porous catalyst layer containing mixed conducting oxide having substantially a perovskite structure and containing a first element selected from Co and Fe, and a second element selected from In, Sn and Y arranged in the B site in the perovskite structure is contiguous to a second surface (1*a*) of a selective oxygen-permeable dense continuous layer (1) containing mixed conducting oxide. A porous intermediate catalyst layer (3) containing mixed conducting oxide and at least one of Co, Fe, Mn and Pd is contiguous to a first layer (1*b*) of the dense continuous layer (1). A porous reactive catalyst layer (4) provided with a metal catalyst selected from at least one of Ni, Co, Ru, Rh, Pt, Pd, Ir and Re and a support is contiguous to the porous intermediate catalyst layer (3) in a manner to sandwich between the dense continuous layer (1) and the porous reactive catalyst layer (4).

37 Claims, 2 Drawing Sheets

US 7,151,067 B2

PORCELAIN COMPOSITION, COMPOSITE MATERIAL COMPRISING CATALYST AND CERAMIC, FILM REACTOR, METHOD FOR PRODUCING SYNTHETIC GAS, APPARATUS FOR PRODUCING SYNTHETIC GAS AND METHOD FOR ACTIVATING CATALYST

RELATED APPLICATIONS

This is a 371 application of PCT/JP02/10577 filed on 11 Oct. 2002, claiming priority to Japanese Application No. 2001-316663 filed on 15 Oct. 2001, No. 2001-316661 filed on 15 Oct. 2001, and No. 2001-336723 filed on 01 Nov. 2001, respectively, the entire contents of which are incorporated herein by reference.

1. Technical Field

The present invention relates to a ceramic composition, composite material of catalyst and ceramics, membrane reactor, production method for synthetic gas, production apparatus for the synthetic gas and method for activating the catalyst suitable for a partition membrane reactor which can conduct an industrial selective permeation and separation process for oxygen, oxidation reaction or partial oxidative reaction of hydrocarbon gas molecule in a single apparatus.

2. Background Art

Conventionally, separation of oxygen from oxygen-containing gas has been an industrially important process. However, oxygen production technology represented by a current low temperature distillation system is capital intensive and energy-guzzling, and though there is some progress in technical improvement in process configuration and the like, it is basically a separation technology based on an extremely small difference between boiling points of oxygen and nitrogen, which makes it difficult to achieve a substantial cost reduction.

Under these circumstances, as a new stream of the oxygen production technology, a high temperature (up to 900° C.) oxygen-separation technology utilizing a dense mixed conductive ceramic membrane as a use of mixed conducting oxide described above has attracted much attention in recent years. Research and development of the high temperature oxygen-separation technology has been rapidly activated particularly in the western countries. Further, it has a possibility to lead to energy-saving with compact equipment.

In the dense mixed conductive ceramic membrane, oxygen ions and electrons are selectively transferred passing through a dense ceramic membrane material which does not permeate other chemical sorts (nitrogen, water, carbon dioxide, and so on). The oxygen ion bonds with an electron coming from the opposite side (anode side) of the membrane on a surface (cathode side) of the dense ceramic membrane to generate oxygen ion. The oxygen ion diffusedly moves in the dense membrane according to the difference in chemical potential of the oxygen ion and release the electron on the anode side to be oxygen molecule again. At this time, the electron moves in the opposite direction of the oxygen ion to keep electric neutrality.

A technology of reforming hydrocarbon-containing gas such as methane or the like as a raw material into hydrogen or synthetic gas (mixed gas of carbon monoxide and hydrogen) has assumed an important position in petroleum chemical process. This reforming technology is combined with a technology to produce synthetic liquid fuel using hydrocarbon-containing gas such as methane and the like as a raw material (Gas-To-Liquids: GTL) or progress of a fuel cell technology, and research and development activities at home and abroad for the above-described technology have been stepping up remarkably in recent years, because the former leads to "effective use of unused natural gas resources and the like" and "supply of a clean energy source friendly to the global environment" and the latter leads to "installment on a clean vehicle", "widespread use of distributed power source", and "use of clean energy".

Under these circumstances, research of using the dense mixed conductive ceramic membrane for not only separation of oxygen from oxygen-containing gas such as air and the like, but also for a reforming reactor has been accelerated recently. In the membrane reforming reactor, air is passed through one side (cathode side) of the membrane, and a catalyst is disposed on the opposite side (anode side) thereof to let hydrocarbon gas such as methane or the like flow to cause a partial oxidative reaction (oxygen is consumed). A reforming catalyst for hydrocarbon is contiguous with the surface of a partition membrane on the raw material gas side (anode side) containing hydrocarbon. On the air side or raw material gas side (cathode side) containing oxygen of the partition membrane, separation of oxygen molecule and ionization reaction take place and oxygen component in the gas changes to oxygen ion which is caught into the partition membrane. The oxygen ion diffuses from the cathode side to the anode side according to chemical potential gradient of oxygen in the partition membrane and partial oxidative reaction of hydrocarbon component on the anode side of the partition membrane occurs. Electron flow in the opposite direction to oxygen ion flow, and ionize oxygen elements on the cathode side. Generally, about 900° C. is adopted as an operation temperature of the reforming reactor. This is because high temperatures of 800 to 900° C. or more are usually required to display a state that dense mixed conductive ceramic material electrically conducts both oxygen ions and electrons sufficiently, in other words, to display high mixed conductivity. With this method, oxygen permeated through the membrane is consumed at once to make a partial pressure of oxygen (chemical potential of oxygen) on the anode side extremely small by a partial oxidative reaction of hydrocarbon, so that difference in chemical potential of oxygen (difference in partial pressure of oxygen), namely a driving force of selective oxygen permeation in the partition membrane eventually becomes remarkably large. Accordingly, an oxygen permeation rate, namely, a partial oxidative reaction rate can be made large. Further, since a partial oxidative reaction of methane and the like can be conducted together with air separation at the same time, in other words, since both separation of oxygen and an oxidation reaction can be performed simultaneously in a single unit, it may result in a compact and inexpensive reactor.

BACKGROUND ART RELATING TO A FIRST INVENTION

In order to bring such a selective permeation and separation process of oxygen, or partition membrane reactor, and the like into a practical use, materials having high oxide ion conductivity are required. As a material to satisfy the requirement, mixed conducting oxide having a perovskite structure is being studied. The perovskite structure is a crystal structure in which cations occupy A site where 12 pieces of anionic oxygen are coordinated and B site where 6 pieces of oxygen are coordinated respectively. Many of the materials studied for the above-described object contain Co or Fe in B site.

For instance, ceramic compositions such as $(La_xSr_{1-x})CoO_{3-\alpha}$, (x is in the range of 0.1 to 0.9, $\alpha$ is 0 to 0.5), which is disclosed in Japanese Patent Application Laid-open No.

Sho 56-92103, $(La_{1-x}Sr_x)(Co_{1-y}Fe_y)O_{3-\delta}$ (x is in the range of 0.1 to 1.0, y is 0.05 to 1.0, δ is 0.5 to 0), which is disclosed in Japanese Patent Application Laid-open No. Sho 61-21717, and so on are known as a useful leading top-rated materials. Further, in Japanese Patent Application Laid-open No. Hei 6-206706, proposed is an oxide ion transfer permeable membrane having an extremely wide composition range composed of $A_xBa_x\cdot B_yB'_{y'}\cdot B''_{y''}\cdot O_{3-z}$ (A is selected from a group consisting of a first, second, and third families in a periodic table and a lanthanoid family of f period adopted by ICUPA, and B, B', and B'' are selected from transition metals of d period. Further, the following conditions of $0 \leq x \leq 1$, $0 < x' \leq 1$, $0 < y \leq 1$, $0 \leq y' \leq 1$, $0 \leq y'' \leq 1$, $x+x'=1$, $y+y'+y''=1$, are satisfied and z is a value determined when electric charge of the composition is neutral). As the concrete examples for the above, $La_{0.2}Ba_{0.8}Co_{0.8}Fe_{0.2}O_{2.6}$, and the like are given.

Y. Teraoka et al. studied an oxygen permeation rate of perovskite structure oxides expressed by a composition formula of $La_{0.6}A'_{0.4}Co_{0.8}Fe_{0.2}O_{3-\delta}$ and pointed out in Chemistry Letters, pp. 503–506, 1988 that the oxygen permeation rate could be improved by containing Ba in A site of the perovskite structure. When considering this knowledge expandedly, it can be expected that improvement of the oxygen permeation rate of the perovskite structure mixed conductor oxides can be realized by substituting Sr or La which are often used as an element placed in A site of the perovskite structure oxides of mixed conductors for Ba as mush as possible. Especially, substitution of La having a valence of 3 for Ba having a valence of 2 leads to increase of oxygen holes in a crystal which is a carrier of oxygen permeation, and an effect of "killing two birds with one stone" is expected as a measure for improvement of the oxygen permeation rate.

However, as shown in "Perovskite related compounds" Kikan Kagaku sosetsu, No.32 (1997), pp. 11–13, edited by Chemical Society of Japan, it is known that when A site of perovskite is replaced from Sr having a small ion radius to Ba having a large ion radius, a structure having a $BaNiO_3$ type or the like becomes more stable than the perovskite structure and easier to appear. It is shown by an actual preliminary experiment carried out by the inventors that though the crystals structure of a sintered body of $SrCo_{0.8}Fe_{0.2}O_{3-\delta}$ was a cubic perovskite structure, in $BaCo_{0.8}Fe_{0.2}O_{3-\delta}$, a phase of low oxygen permeation rate different in crystal structure from the perovskite structure was found. This different phase is belonged to a hexagonal $12H\text{-}BaCoO_{3-x}$ type structure, reported by A. J. Jacobson et al. in J. Solid State Chemistry, vol.35 (1980) pp.334–340, which is similar structure to $BaNiO_3$ type.

Similarly, a $La_{0.2}Sr_{0.8}CoO_{3-\delta}$ sintered body has a cubic perovskite structure while $La_{0.2}Ba_{0.8}CoO_{3-\delta}$ has fallen into a $12H\text{-}BaCoO_{3-x}$ type structure. Conventionally, Y has been recognized as an element to substitute for La in A site of the perovskite as Masannek et al. disclosed in Japanese Patent Application Laid-open No. Hei 6-56428. However, as a result that the present inventors synthesized a composition containing Y in A site and having a large ratio of Ba, such as $Ba_{0.8}Sr_{0.1}Y_{0.1}CoO_{3-\delta}$, and studied the structure, a stable perovskite structure could not be obtained. H. W. Brinkman studied $BaCo_{0.95}Y_{0.05}O_{3-\delta}$ which substituted Y in B site, and reported that the crystal structure was $BaCoO_{3-x}$ type hexagonal as expected, in Solid State Ionics, Vol.68(1994) PP.173–176. As described above, substitution by Ba in A site was reconfirmed as a factor to make the perovskite structure unstable.

As mentioned above, different phase such as $BaNiO_3$ type or its analogous structure is extremely low in oxygen permeation rate, materials showing these phases cannot be used in an oxygen-separation apparatus or the like. In other words, when the oxygen permeation rate is intended to be improved by increasing Ba ratio by substituting Ba for La or Sr in A site in conventional mixed conducting oxide material such as $(La_{1-x}Sr_x)(Co_{1-y}Fe_y)O_{3-\delta}$, it used to have a dilemma that stability of a cubic perovskite structure becomes insufficient, and a different phase such as $BaNiO_3$ type is appeared to make the oxygen permeation rate rather low.

BACKGROUND ART RELATING TO A SECOND INVENTION

A process of oxygen permeating through the ceramic membrane can be evaluate by dividing the process into three processes of decomposition reaction of oxygen molecule into oxygen ion (cathodic reaction), a diffusion transfer depending on a chemical potential difference of oxygen ion, a reaction of oxygen ion into an oxygen element and/or oxygen molecule and further oxidizing hydrocarbon (anodic reaction). Improvement of the oxygen permeation rate per unit area requires to rate up these three processes in co-ordination with each other. Otherwise, any of the aforementioned processes serves as a rate-determining step, a high oxygen permeation rate as a whole cannot be obtained. For instance, it would be an effective measure for increasing diffusion transfer rate of oxygen ion in the membrane to make the dense mixed conductive ceramic material membrane thin, but, on the other hand, the rate of cathodic reaction and/or anodic reaction come(s) to control whole oxygen permeation process with a certain thickness or below thereof so that an effect of increasing oxygen permeation rate by decreasing of membrane thickness cannot be obtained. Therefore, in order to obtain much higher oxygen permeation rate, not only thinning of a dense portion, but also improvement of cathodic and anodic reaction rates becomes an important problem.

For this problem, WO98/41394 discloses a technology relating to a three-layer structured composite material of catalyst and ceramics, in which a porous layer using analogous material to dense ceramic material to promote cathodic reaction by increasing of surface area, is added to the side of oxygen-containing gas such as air of the dense mixed conductive ceramic membrane which is used for producing synthetic gas by a partial oxidative reaction of hydrocarbon such as methane or the like, and a partial oxidation catalyst is put contiguously to the opposite side surface. However, there is no concrete description concerning a structure and material composition of a layer to serve as a partial oxidation catalyst. The present inventors used, in trial, a catalyst layer having an oxide support to support a metal catalyst as a partial oxidation catalyst layer, a dense membrane and a mixed conducting oxide as a porous layer, letting methane gas flow in the catalyst layer side and letting air flow in the porous layer side, and oxygen permeation rate (calculated from partial oxidative reaction rate) of three-layered structure described in WO98/41394 was measured to find the oxygen permeation rate being not large, and a room for further improvement in a material structure to obtain a high oxygen permeation rate.

Japanese Patent Application Laid-open No. Hei 7-240115 discloses a three to four layered structure ion transfer membrane which applies a single-layered oxygen dissociating catalyst to promote a cathodic reaction on a first surface of a membrane consisting of a close-packed (dense) multi-component metallic oxide layer by coating, and allows a single-layered or a multi-layered porous layer consisting of mixed conductive multi-component metallic oxide or substance not exhibiting mixed conductivity according to operational conditions of the process, to be contiguous on a second surface, for the purpose of promoting an anodic reaction and adding mechanical strength to the dense membrane. Japanese Patent Application Laid-open No. Hei 7-240115 is an invention intending mainly to develop a separating technology of oxygen from oxygen-containing gas such as air and the like, and "oxidation of organic compounds containing hydrocarbon" is described as a usage of the aforementioned ion transfer membrane in a paragraph [0015] and claim 46 of the specification thereof. In the aforementioned ion transfer membrane, a reactive catalyst prepared by including a metallic catalyst and a support in a porous layer or MC porous layer (a porous layer of mixed conductive multi-component metallic oxide) is not included at all. More concretely, materials cited in claims as composing the above-described porous layer are multi-component metallic oxide, metal alloy reacting with oxygen at high temperatures, zirconia for stabilizing metallic oxide, ceria, alumina which does not conduct electron or oxygen, magnesia, and so on, and a reactive catalyst formed with a metallic catalyst and a support is not included. Besides, materials forming MC porous layer are multi-component metallic oxides and a reactive catalyst composed of a metallic catalyst and a support is not included either. Japanese Patent Application Laid-open No. Hei 7-240115 should be thought basically to be an invention defining a structure of an ion transfer membrane promoting a cathode side and/or anode side reaction(s), and claims a very wide range of materials forming an ion transfer membrane. However, since explanation for the reason is not enough, it is practically impossible to concretely select the material based on the specification in question or by simple test except the case described in the embodiments even for a person skilled in the art. The present inventors used, in trial, a mixed conductive multi-component metallic oxide (the same as the mixed conducting oxide in the composition described in claim 4 of the present specification) as a porous layer contiguous to a dense membrane and a second surface of the membrane, and a oxide support holding metal catalyst layer (the same as the porous reactive catalyst layer described in claim 5 of the present specification) as a catalyst layer contiguous to a first surface of the membrane, letting methane gas flow in the second surface side and air flow in the first surface side so that the ion transfer membrane works in a manner that "supply gas containing oxygen comes into contact with a catalyst surface of the membrane" as described in paragraph [0015], and oxygen permeation rate (calculated from oxidation reaction rate) was measured. As a result, it was found that the oxygen permeation rate was not large and there was a plenty of room for improvement in material structure. It should be noted that in the case of changing the gas flow, that is, letting methane gas flow in the first surface side and letting air flow in the second surface side, the result was the same as what the present inventors conducted for the aforementioned WO98/41394, and there found still a room for improvement in material structure as already explained.

As described above, as for a membrane-type synthetic gas production technology from hydrocarbon and oxygen-containing gas relating to the present invention using a composite material of catalyst and ceramics, though only a common membrane structure promoting a cathodic and/or anodic reaction has been disclosed, but concrete technology for a composite material of catalyst and ceramics to create partial oxidative reaction of hydrocarbon in a stable manner while promoting both cathodic and anodic reactions, and to obtain a sufficiently high oxygen permeation rate for practical use has not been disclosed, and a room for improvement is still remained.

BACKGROUND ART RELATING TO A THIRD INVENTION

In order to industrialize a membrane reforming reactor, an absolutely necessary condition is establishment of a basic technology to be able to conduct synthetic gas production in a stable manner while obtaining a high oxygen permeation rate by a suitable combination of a dense mixed conductive ceramic membrane and a methane (or hydrocarbon) reforming catalyst which are basic component materials, and appropriate adjustment of reaction conditions. Concerning this basic technology, WO99/21649 discloses a method of arranging a methane-reforming catalyst, catalyst materials for the same, and ceramic membrane materials. Further, U.S. Pat. No. 6,033,632 discloses ceramic membrane materials and methane-reforming catalyst materials. These technologies are characterized by using materials having a very high reduction-resistance for a dense ceramic membrane, and by using a catalyst material highly compatible with the aforementioned materials.

Before conducting the present invention, the present inventors prepared a dense ceramic membrane material having the thickness of a little less than 1 mm described in WO99/21649 or U.S. Pat. No. 6,033,632 and confirmed that it easily cracks and splits. Further, the oxygen permeation rate measurement was conducted by putting a methane-reforming catalyst contiguous to a dense ceramic membrane which did not crack or split and feeding air and methane, and cleared experimentally that the oxygen permeation rate was low and the crack or split was easily brought about during the experiment. In other words, it was experimentally confirmed that a practical oxygen permeation rate could not be obtained with the material described in these documents without setting the thickness of the dense ceramic membrane to be 0.1 mm or less, and the crack and split were easily brought about not only during the preparation stage but also during the experiment. Since a dense ceramic membrane of 0.1 mm or less in thickness is too small in mechanical strength and not usable as a self-supporting membrane, it is required to be used by covering it on a porous substrate. However, it is extremely difficult to produce a porous substrate having a sufficient mechanical strength, and being small in flow resistance of gas components within holes using materials easily causing crack or split, and to cover economically a dense ceramic membrane on a porous substrate rich in pores and small in flow resistance of gas.

On the other hand, formation of a dense ceramic membrane using a material easily permeable for oxygen and low in reduction-resistance, using a material in which a reasonable amount of Co is contained in B site of a compound, for instance, having a perovskite structure has been long conducted. However, sufficient study has not been made in the past for a combination of a dense ceramic membrane material and a methane-reforming catalyst material, and a method of disposing a catalyst for it. In other words, a suitable concrete combination of materials to conduct production of synthetic gas based on a high oxygen permeation rate with a long term stability under conditions of methane-containing gas pressure from low to high, a method of disposing a catalyst, appropriate adjustment of the reaction conditions depending on these items are inevitable for a practical synthetic gas production method. However, these technologies have not yet been disclosed.

SUMMARY OF THE INVENTION

A first object of the present invention is to provide a ceramic composition which is high in rate of Ba in A site in a perovskite mixed conducting oxide, and at the same time, a cubic perovskite phase is sufficiently stable, and showing a high oxygen permeation rate.

A second object of the present invention is to provide a composite material of catalyst and ceramics, and a membrane reactor, which are used for a membrane reactor to produce synthetic gas from oxygen-containing gas and hydrocarbon as raw materials, to create partial oxidative reaction of hydrocarbon in a stable manner while promoting both cathodic and anodic reactions, and to obtain oxygen permeation rate higher than that in prior art.

A third object of the present invention is to provide a composite material of catalyst and ceramics, a production method for synthetic gas, a production apparatus for the synthetic gas, and a method of activating the catalyst to produce synthetic gas with high energy efficiency, at low cost, and in a stable manner for a long period.

A first ceramic composition according to the present invention is a ceramic composition of mixed conducting oxide having a substantially perovskite structure, containing: Ba; at least one kind of element selected from a first group consisting of Co, and Fe; and at least one kind of element selected from a second group consisting of In, Sn and Y, in which the element selected from the second group is arranged in B site of the perovskite structure.

A second ceramic composition according to the present invention is a ceramic composition of mixed conducting oxide having a substantially perovskite structure, expressed by the following composition formula (formula 1).

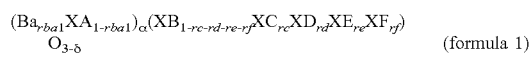

$$(Ba_{rba1}XA_{1-rba1})_\alpha(XB_{1-rc-rd-re-rf}XC_{rc}XD_{rd}XE_{re}XF_{rf})O_{3-\delta}$$ (formula 1)

(Where XA denotes at least one kind of element selected from a third group consisting of Sr, Ca and lanthanoide; XB denotes at least one kind of element selected from a first group consisting of Co and Fe; XC denotes at least one kind of element selected from a second group consisting of In, Y, and Sn; XD denotes at least one kind of element selected from a fourth group consisting of Nb, Ta, Ti, and Zr; XE denotes at least one kind of element selected from a fifth group consisting of Cu, Ni, Zn, Li and Mg; and XF denotes at least one kind of element selected from a sixth group consisting of Cr, Ga, and Al. As for the range of rba1, when XC contains only In, it fulfills the condition of $0.4 \leq rba1 \leq 1.0$; when XC contains only Y, it fulfills the condition of $0.5 \leq rba1 \leq 1.0$; when XC contains only Sn, it fulfills the condition of $0.2 \leq rba1 \leq 1.0$; and when XC contains two or more elements composing the second group, it fulfills the condition of $0.2 \leq rba1 \leq 1.0$. As for the range of rc, when XC contains only Y, it fulfills the condition of $0.06 \leq rc \leq 0.3$; when XC contains at least any one of In or Sn, it fulfills the condition of $0.02 \leq rc \leq 0.3$. The range of rd fulfills the condition of $0 \leq rd \leq 0.2$; the range of re fulfills the condition of $0 \leq re \leq 0.2$; the range of rf fulfills the condition of $0 \leq rf \leq 0.2$; the range of $\alpha$ fulfills the condition of $0.9 \leq \alpha \leq 1.1$; and $\delta$ is a value determined to fulfill the condition of neutral electric charge.)

A first composite material of catalyst and ceramics of the present invention includes: a selective oxygen-permeable dense continuous layer containing a mixed conducting oxide; a porous intermediate catalyst layer containing a mixed conducting oxide contiguous to a first surface of the dense continuous layer; a porous reactive catalyst layer containing a metal catalyst and a catalyst support, contiguous to the porous intermediate catalyst layer in a manner to sandwich the porous intermediate catalyst layer between the dense continuous layer and the porous reactive catalyst layer; and a porous catalyst layer containing a mixed conducting oxide, contiguous to a second surface of the dense continuous layer.

A membrane reactor according to the present invention includes a composite material of the above-described catalyst and ceramics.

A second composite material of catalyst and ceramics according to the present invention includes: a dense ceramic membrane containing mixed conducting oxide having a crystal structure of perovskite expressed by the following composition formula (formula 2); and a catalyst portion contiguous to a first surface of the dense ceramic membrane, and containing magnesia and Ni.

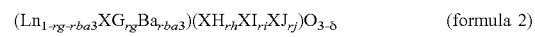

$$(Ln_{1-rg-rba3}XG_{rg}Ba_{rba3})(XH_{rh}XI_{ri}XJ_{rj})O_{3-\delta}$$ (formula 2)

(Where Ln denotes at least one kind of element selected from lanthanoide; XG denotes at least one kind of element selected from the seventh group consisting of Sr and Ca; XH denotes at least one kind of element selected from an eighth group consisting of Co, Fe, Cr, and Ga, in which the sum total of the number of moles of Cr and Ga is 0 to 20% to the sum total of the number of moles of the elements composing the above-described eighth group; XI denotes at least one kind of element selected from a ninth group consisting of Nb, Ta, Ti, Zr, In and Y, including at least one kind of element selected from a tenth group consisting of Nb, Ta, In and Y; and XJ denotes at least one kind of element selected from an eleventh group consisting of Zn, Li and Mg. As for the range of rba3, when XI contains only In, it fulfills the condition of $0.4 \leq rba3 \leq 1.0$, when XI contains only Y, it fulfills the condition of $0.5 \leq rba3 \leq 1.0$, and when XI contains only In and Y, it fulfills the condition of $0.2 \leq rba3 \leq 1.0$. The range of "rg+rba3" fulfills the condition of $0.8 \leq rg+rba3 \leq 1$, the range of rh fulfills the condition of $0 < rh$, the range of ri fulfills the condition of $0 \leq ri \leq 0.5$, the range of rj fulfills the condition of $0 \leq rj \leq 0.2$, and the range of "rh+ri+rj" fulfills $0.98 \leq rh+ri+rj \leq 1.02$. $\delta$ is a value determined to fulfill the condition of neutral electric charge.)

A method of producing synthetic gas according to the present invention includes a step of making an atmosphere, to a partition membrane including a dense ceramic membrane and a catalyst portion contiguous to a first surface of the dense ceramic membrane, on the catalyst portion side of the partition membrane a gas atmosphere containing hydrocarbon, and atmosphere on the dense ceramic membrane side a gas atmosphere containing oxygen, in which the dense ceramic membrane contains a perovskite structure mixed conducting oxide whose composition is expressed by the composition formula (formula 2), and the catalyst portion contains magnesia and Ni.

A production apparatus for synthetic gas according to the present invention includes a partition membrane provided with a dense ceramic membrane having a mixed conducting oxide whose composition is expressed by the composition formula (formula 2) and whose crystal structure is perovskite, and a catalyst portion contiguous to a first surface of the dense ceramic membrane and containing magnesia and Ni.

A method of activating a catalyst according to the present invention includes a step of making an atmosphere, to a partition membrane provided with a dense ceramic membrane whose crystal structure is perovskite, and a catalyst portion contiguous to a first surface of the dense ceramic membrane containing a composition expressed by the following composition formula (formula 6), on the catalyst portion side of the partition membrane a gas atmosphere containing methane whose pressure is 0.3 Mpa or more, and atmosphere on the dense ceramic membrane side a gas atmosphere containing oxygen.

$$Ni_{rni}Mn_{rmn}Mg_{1-rni-rmn}O_c \quad \text{(formula 6)}$$

(Wherein the range of rni fulfills the condition of $0<rni\leq0.4$ while the range of rmn fulfills the condition of $0\leq rmn\leq0.1$. c is a value determined to fulfill the condition of neutral electric charge.)

By applying the above-described ceramic composition, it is possible to obtain a composite material, oxygen-separation apparatus, and chemical reaction apparatus for gas separation having a high oxygen permeation rate.

DETAILED DESCRIPTION OF THE PREFERRED EMBODIMENTS

Figure 1:
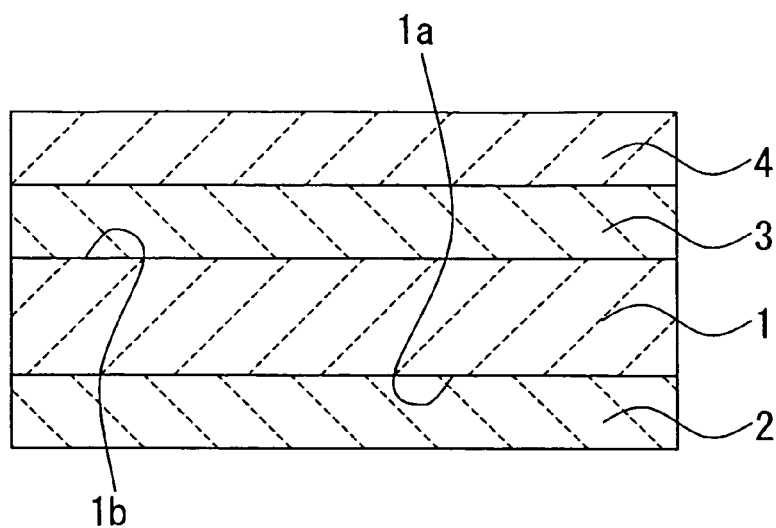
FIG. 1 is a sectional view showing a structure of a composite material of catalyst and ceramics relating to a first embodiment of a second invention.

The present inventors have come up with three inventions as a result of earnest studies to solve the above problems. A first invention relates to a composition formula and a crystal structure of a ceramic composition. A second invention relates to a four-layered composite material of ceramics. A third invention relates to a composition formula of a dense ceramic membrane and a catalyst portion in a three-layered composite material of ceramics. Hereinafter, the invention is roughly divided into these three inventions, and respective preferred embodiments will be explained.

(First Invention)

The first invention will be explained first.

The present inventors have investigated materials which can maintain a perovskite structure stably even when a ratio of Ba in A site is made rich in a perovskite structure mixed conducting oxide Co or Fe in B site.

As a result, it was confirmed that the more the Ba, the less stable the perovskite structure relatively. Further, it was found that even with an element which can obtain a perovskite stabilizing effect by making a substitutional solid solution easily in the compositional range of high Sr concentration, there was possibility to arise a problem that in the range of high Ba concentration, precipitation comes out without making the substitutional solid solution, or the perovskite stabilizing effect cannot be obtained. Then, the range of search was expanded to a compositional range which had not been studied so much before as a perovskite structure mixed conducting oxide material, or a compositional range containing elements which were not effective in a positional range of high Sr concentration, and the inventors have continued earnest study. As a result, it was found that, in the case of containing any one of In, Y or Sn, or two kinds or more out of these elements in B site, the stabilization effect of perovskite could not be obtained in a compositional range of high Sr concentration, but the stabilization effect of perovskite was exceptionally obtained in the range of high Ba concentration.

In the case of containing In, it was found that a crystal structure with a composition of high Ba concentration, for instance, the crystal structure of $Ba_{0.9}Sr_{0.1}Co_{0.9}In_{0.1}O_{3-\delta}$ had a cubic perovskite structure in the temperature range from a room temperature to 1000° C., and yet an oxygen permeation rate was extremely high. On the other hand, with Al and Ga which are the same group as In in the periodic table, in the range of a high Ba ratio, such a powerful stabilization effect of the perovskite structure could not be obtained.

In the case of containing Y, the crystal structure of $Ba_{0.9}Sr_{0.1}Co_{0.9}Y_{0.1}O_{3-\delta}$ or $BaCo_{0.9}Y_{0.1}O_{3-\delta}$ which is a composition in which Y is in B site was found that a cubic perovskite structure is stable in a temperature range from a room temperature to 1000° C. or more. On further detailed studies of these perovskite structure oxides, it was confirmed that these oxides become larger in lattice constant, compared with the other perovskite oxide containing about the same amount of Ba, for instance, $Ba_{0.9}Sr_{0.1}Co_{0.9}In_{0.1}O_{3-\delta}$. This result shows that in $Ba_{0.9}Sr_{0.1}Co_{0.9}Y_{0.9}O_{3-\delta}$ and others, the reason why Y shows a powerful perovskite stabilization effect is not because Y enters into A site by substituting for Ba or Sr which has a larger ion radius than Y but because it enters into B site by substituting for Co which has an ion radius smaller than that of Y. Further, it was found that this perovskite stabilization effect with Y alone requires to substitute Y by 6% or more.

On the other hand, for instance, in $SrCo_{0.9}Y_{0.1}O_{3-\delta}$, a different phase is created, and even when Y is arranged in B site for a composition having a rich Sr ratio, it is found that the perovskite stabilization effect is insufficient. Further, a crystal structure in which a lanthanoide series element which often shows an effect similar to Y, for instance, $Ba_{0.9}Sr_{0.1}Co_{0.9}La_{0.1}O_{3-\delta}$ and the like in which La or the like is arranged in B site is found to be not a perovskite structure. From the above-described result, a conclusion that Y solubilized in B site is a perovskite stabilization element working exceptionally in the range of rich Ba ratio.

As a result of further studies, in the range of rich Ba ratio, the one containing Sn in B site is also found to have a perovskite structure exceptionally stabilized.

Based on the new knowledge described above, compositional ranges in which the perovskite stabilization effect could be obtained with respective elements were searched for, and further, assiduous studies were added to compatibility with other elements, and the present inventors finally have completed the present invention.

As is clear from the above description, the point of the first invention is to allow the perovskite structure to exist stably in a compositional range containing high Ba ratio by arranging any one of In, Sn, or Y, or two kinds or more among them in B site in a perovskite structure mixed conducting oxide containing Ba and Co and/or Fe. Among the above-described elements, in order to obtain the effect of the present invention, it is important for especially Y to be arranged in B site.

A more concrete formulation of a ceramic composition relating to the first invention is expressed by, for instance, a composition formula (formula 1).

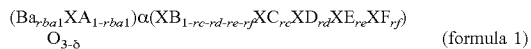

$$(Ba_{rba1}XA_{1-rba1})\alpha(XB_{1-rc-rd-re-rf}XC_{rc}XD_{rd}XE_{re}XF_{rf})O_{3-\delta} \quad \text{(formula 1)}$$

(Where XA denotes at least one kind of element selected from the third group consisting of Sr, Ca and lanthanoide; XB denotes at least one kind of element selected from the first group consisting of Co and Fe; XC denotes at least one kind of element selected from the second group consisting of In, Y, and Sn; XD denotes at least one kind of element selected from the fourth group consisting of Nb, Ta, Ti, and Zr; XE denotes at least one kind of element selected from the fifth group consisting of Cu, Ni, Zn, Li and Mg; and XF denotes at least one kind of element selected from the sixth group consisting of Cr, Ga, and Al. As for the range of rba1, when XC contains only In, it fulfills the condition of $0.4 \leq rba1 \leq 1.0$; when XC contains only Y, it fulfills the condition of $0.5 \leq rba1 \leq 1.0$; when XC contains only Sn, it fulfills the condition of $0.2 \leq rba1 \leq 1.0$; and when XC contains two or more elements composing the second group, it fulfills the condition of $0.2 \leq rba1 \leq 1.0$. As for the range of rc, when XC contains only Y, it fulfills the condition of $0.06 \leq rc \leq 0.3$; when XC contains at least either one of In or Sn, it fulfills the condition of $0.02 \leq rc \leq 0.3$. The range of rd fulfills the condition of $0 \leq rd \leq 0.2$; the range of re, fulfills the condition of $0 \leq re \leq 0.2$; the range of rf, fulfills the condition of $0 \leq rf \leq 0.2$; the range of $\alpha$, fulfills the condition of $0.9 \leq \alpha \leq 1.1$. $\delta$ is a value determined to fulfill the condition of neutral electric charge.)

A ceramic composition relating to the first invention has a perovskite structure. A site of the perovskite structure may contain one kind of element or a plural kinds of elements selected from Sr, Ca, lanthanoide elements and so on as well as Ba. These elements correspond to XA in formula 1. As described above, when one or more elements other than Ba is made to co-exist in A site, the stability of the perovskite structure is improved more.

However, as clear from the description above, in order to obtain a mixed conductor material having a higher oxygen permeation rate, Ba is preferably contained in a high ratio. A preferable ratio of Ba to maintain the perovskite structure stable depends on the kind of element denoted by XC in formula 1 whether it is In, Y or Sn. The ratio of Ba in A site is expressed by ra in formula 1. When XC is In, the value of ra is in the range of $0.4 \leq ra \leq 1.0$, more preferably $0.6 \leq ra \leq 1.0$. When XC is Y, the value of ra is in the range of $0.5 \leq ra \leq 1.0$, more preferably $0.6 \leq ra \leq 1.0$. When XC is Sn, the value of ra is in the range of $0.2 \leq ra \leq 1.0$, more preferably $0.5 \leq ra \leq 1.0$. When XC is a combination of two or more kinds among In, Y, or Sn, the value of ra is in the range of $0.2 \leq ra \leq 1.0$, more preferably $0.6 \leq ra \leq 1.0$. If the value of ra is smaller than these ranges, in other words, when the ratio of Ba is small, stabilization of the perovskite structure is not sufficient, and a different phase such as $BaNiO_3$ is created.

B site in the perovskite structure contains at least either one of Co or Fe, and is required to contain at least one out of In, Y, and Sn without fail. As described earlier, In, Y, or Sn can be used alone, or can be used in combination. The ratio of total sum of In, Y, and Sn in B site is expressed as rc in formula 1. When XC is Y alone, the value of rc is in the range of $0.06 \leq rc \leq 0.3$. When XC is either In or Sn, or a combination of two or more kinds among In, Y, and Sn, the value of rc is in the range of $0.02 \leq rc \leq 0.3$, more preferably $0.05 \leq rc \leq 0.2$. If the total sum of In, Y, and Sn is made large, the stability of the perovskite structure is improved, but if the total sum is made much larger than this range, it turns into problems such as generation of a second phase, lowering of oxygen permeation property, and so on. On the contrary, if it is made smaller than this range, the stabilization of the perovskite structure is not sufficient.

The ceramic composition (mixed conductor material) according to the first invention may contain Nb, Ta, Ti, Zr, Cu, Ni, Zn, Li, Mg, Cr, Ga, Al, and so on other than these elements. Any of these elements replaces B site of the perovskite structure, provided that there is a preferable range for replacement for each element in view of oxygen permeation rate or stability of the perovskite structure. XD in formula 1 is any one of Nb, Ta, Ti, and Zr, or a combination of two or more kinds among these elements. XE in formula 1 is any one of Cu, Ni, Zn, Li, and Mg, or a combination of two or more kinds among these elements. XF is any one of Cr, Ga, and Al, or a combination of two or more kinds among these elements. The value of rd is preferably in the range of $0 \leq rd \leq 0.2$, the value of re is preferably in the range of $0 \leq re \leq 0.2$, and the value of rf is preferably in the range of $0 \leq rf \leq 0.2$. Increase of the amount of element replacement beyond these ranges causes a problem such as creation of a different phase, large decrease of oxygen permeation rate, and so on. In addition to the above, in order to obtain higher oxygen permeation rate, it is preferable for the value of "1-rc-rd-re-rf" showing the Co content and Fe content to be 0.7 or more.

The ratio $\alpha$ of A site to B site is in the range of $0.9 \leq \alpha \leq 1.1$, more preferably in the range of $0.98 \leq \alpha \leq 1.02$. It is possible to control degree of sintering of materials by shifting the ratio $\alpha$ from 1 to some degree. However, if the ratio of A site and B site is out of this range, it is not favorable because of creation of the second phase. Especially when it contains Y, if the value of $\alpha$ is smaller than 0.9, it tends more to create a different phase.

Even if this ceramic composition (mixed conducting oxide) contains a few impurities, there occurs no big deterioration in its characteristic feature. However, the allowance is preferably 5% or less to the total when expressed by mole ratio of the elements, more preferably 2% or less. If it contains impurities in an amount larger than this range, it may cause a problem of creating a different phase, lowering of oxygen permeation rate or others. On the other hand, the ceramic composition of the first invention (mixed conducting oxide) can make a composite with the second phase in a degree of not giving an influence to oxygen permeation ability. For instance, when a composite is made with an amount of about 2 to about 20 mass % of metal such as Ag, Ag—Pd, Pt and the like, it is possible to increase an ability of sintering and material strength.

As will be described later, the ceramic composition relating to the first invention can be also used as a porous substrate, a dense continuous layer, or as a catalyst for promoting oxygen exchange reaction on a membrane surface in a composite material for oxygen separation or chemical reaction apparatus. When this material is used as a porous substrate, it can match relatively with ease in thermal expansion with metal members and the like composing an apparatus and an effect of promoting an oxygen exchange reaction between a gas phase and a mixed conducting oxide on a surface of a dense continuous layer. On the other hand, when this material is used as a dense continuous layer, it becomes possible to produce a composite material having especially a high oxygen permeation rate.

The ceramic composition relating to the first invention is applicable to a composite material. In such a composite material, a porosity of a porous substrate is required to be 20% to 80%. When the porosity is out of this range, it turns into a problem such as generation of high ventilation resistance during oxygen permeation, or big damage in mechanical characteristics of the supporter. Though a preferable range of the thickness of the porous substrate differs according to the structure or operational conditions of apparatus, it is typically 500 µm to 10 mm. If the thickness of the porous substrate is thicker than this range, it may cause a problem of making the ventilation resistance large during oxygen permeation. If the thickness of the porous substrate is thinner than this range, it may cause a problem of making the mechanical characteristics insufficient. On the other hand, an agreeable thickness of a dense continuous layer is 10 µm to 2 mm. If the thickness of the continuous layer is out of this range, it sometimes causes a problem of increase in the amount of leak gas or lowering of oxygen permeation rate.

For producing a porous substrate in such a composite material, a method generally used for producing a ceramic porous body is applicable. What can be cited as one of the method for producing a porous substrate is that oxide containing necessary elements is used as a raw material and sintered. Another method is that salts, for instance, inorganic salts such as carbonate, nitrate, sulfate, and the like, organic salts such as acetate, oxalate, and the like, halides such as chloride, bromide, iodide and the like, or hydroxide or oxi-halide are used other than oxide as a raw material, and mixed in a predetermined ratio, and sintered. A method of dissolving a water-soluble salt among the above-described salts at a predetermined ratio to evaporate and dry the solution, a method of drying with a freeze dry method, and a spray dry method, then to sinter, a co-precipitation method of dissolving a water-soluble salt in water, and thereafter, adding an alkaline solution such as aqueous ammonia to co-precipitate as a hydroxide and to sinter, or a sol-gel method and the like of using metal alkoxide as a raw material, and hydrolyzing it to obtain a gel and to sinter can be used.

Sintering of a porous substrate is generally conducted in a two-step of calcinations and main firing (sintering). The calcinations is generally conducted at the temperature range of 400 to 1000° C. for several hours to ten and several hours to produce a calcinated powder. It is also possible to mold the powder after calcination (calcinated powder) without any process for successive main sintering, or to mix resin such as polyvinyl alcohol (PVA) into the calcinated powder for molding and main sintering. Though the temperature for main sintering depends on composition and the like, it is generally in the range of 700 to 1400° C., and preferably in the range of 1000 to 1350° C. Though the main sintering period of time depends on the composition and the temperature for sintering, it generally requires several hours or more. It is sufficient for the atmosphere of the main sintering to be generally in the air, but it is also acceptable to conduct sintering under a controlled atmosphere if necessary. As a method of molding a porous substrate, similarly to a typical production method of bulk ceramics, it is acceptable to pack the calcinated powder or mixed powder in a dice to carry out pressure molding, and also acceptable to use slurry casting, an extrusion method or the like.

The dense continuous membrane in the ceramic composition relating to the first invention can be manufactured by a method usually used for manufacturing, for instance, a ceramic membrane. It is also possible to make a membrane by the so-called thin-film forming method such as PVD or CVD in the vapor deposition method or the like. As a simpler and more economical method, it is preferable to adopt a method of coating a porous substrate with a raw material powder or a calcinated powder in a slurry state and then sintering it.

As the temperature for sintering of the dense continuous membrane, it is necessary to create conditions under which a dense membrane can be formed lest gas leakage should occur and lest the porosity of the porous substrate should become much lower during the sintering process. A temperature for main sintering is usually in the range of 700 to 1400° C., and preferably 1000 to 1350° C. For the sintering period of time, it generally needs several hours. Sintering of the dense continuous membrane may be conducted after main sintering of the porous substrate separately, or it may be conducted simultaneously with the main sintering of the supporter. The density of the dense continuous membrane is preferably 85% or more of the theoretical density lest gas leakage should occur, more preferably 93% or more.

With the composite material formed by the above-described process, in order to perform selective permeation and separation of oxygen from mixed gas containing oxygen, it can be realized by making a potential of oxygen on both side of the composite material different from each other. For instance, in order to separate oxygen from air, it is sufficient to apply pressure on an air side or a raw material side, or to reduce pressure on a take-out side of oxygen. For instance, oxygen can be produced by applying pressure on the air side at 10 to 30 atm, and adjusting the oxygen-permeating side to one atm. It is also acceptable to apply 1 to 30 atm of pressure on the air side and to reduce the oxygen-permeating side to about 0.05 atm. Further, in order to produce oxygen rich air, it is sufficient to apply pressure of 10 to 30 atm on the air side, and supply 1 atm of air on the opposite side. The temperature of oxygen-separation work is in the range of 500 to 1000° C., preferably in the range of 650 to 950° C.

Thus, the ceramic composition relating to the first invention and composite materials to which the ceramic composition is applied can be applied to apparatuses and the like for producing pure oxygen or oxygen rich air. It is also applicable in uses other than oxygen separation, especially, a chemical reaction apparatus involving an oxidation reaction. For instance, it is possible to apply it to a reaction apparatus of a partial oxidative reaction of methane for producing synthetic gas composed of carbon monoxide and hydrogen from methane. Conventionally, a reaction apparatus to obtain synthetic gas by a catalytic reaction using mixed gas of methane and oxygen as a raw material has been used. On the other hand, in a reaction apparatus using the ceramic composition (oxide ion mixed conductive ceramics) relating to the first invention, for instance, it is sufficient to let air (or mixed gas containing oxygen) and methane flow separately, partitioned by a mixed conducting oxide, and to arrange a catalyst for synthetic gas production such as Rh or the like on the surface of the mixed conducting oxide on the side where methane flows by coating or the like. By heating ceramics at the range of about 500 to about 1000° C., only oxygen permeates based on the same principle as oxygen separation, then reacts with methane on the surface of the ceramics on the methane side to produce synthetic gas.

Accordingly, when a chemical reaction apparatus applying the ceramic composition relating to the first invention is used, there is no need to produce oxygen in advance as was required in the case of the prior art and no raw material gas is involved. Therefore, a large effect such as synthetic gas can be obtained effectively, a production apparatus can be simple because the reaction occurs successively, and so on is assured. Further, the ceramic composition relating to the first invention can be applied to all chemical reaction apparatus involving oxidative chemical reaction such as partial oxidation of hydrocarbon to form olefin, partial oxidation of ethane, substitution of aromatic compounds, and so on other than partial oxidation of methane.

An experiment of the first invention will be explained next. However, this is only for explaining the first invention by using the experiment, and the scope of the first invention is not limited to this experiment.

In this experiment, dense sintered samples were prepared, and each crystal structure and oxygen permeation rate was evaluated. $CaCO_3$, $SrCO_3$, $BaCO_3$, $La_2O_3$, $Fe_2O_3$, $Co_3O_4$, $In_2O_3$, $Y_2O_3$, $SnO_2$, $Nb_2O_5$, $Ta_2O_3$, $TiO_2$, $ZrO_2$, $CuO$, $NiO$, $ZnO$, $Li_2CO_3$, $MgO$, $Cr_2O_3$, $Ga_2O_3$ and $Al_2O_3$ were used as raw materials. After weighing a predetermined amount for each sample, mixing by a ball mill with zirconia balls was conducted for 24 hours using isopropyl alcohol as a dispersion medium. Obtained slurry was dried and crashed into powder, packed into a square pod made of MgO, and calcinated exposed to air for 12 hours at 850° C. Then, the obtained calcinated powder was pulverized, filled into a die of 12 mm φ, formed into a tablet by uniaxial pressing, and packed further into an ice bag to conduct CIP forming. Then, the obtained molded product was sintered in a square pod made of MgO at a sintering temperature between 1000° C. and 1300° C. for 5 hours to obtain a sintered sample of about 10 mmφ in diameter.

The sintered sample was polished to 1 mm in thickness, made to adhere on a top of an $Al_2O_3$ tube, and the inside of the tube was decompressed while the outside was exposed to the air to measure the partial pressure of oxygen on the decompressed side, and the oxygen permeation rate was evaluated based on the difference from a partial pressure value in the case of no oxygen permeation through the sintered sample. The sample temperature was set to 850° C. The oxygen permeation rate is expressed by a permeated volume of oxygen in a standard state per one minute per unit surface area of the mixed conducting oxide, and the unit is ml/min/cm². Presence of gas leakage through the sintered sample was confirmed by replacing the outside atmosphere into a mixture of air and helium, using a helium leak detector. As a result, no gas leakage was recognized for the samples within the scope of the present invention.

Compositions of the sintered samples, the result of identification of the component phase using a powder X-ray diffraction method at a room temperature, and a measured value of the oxygen permeation rate are shown in Table 1 and Table 2.

In Table 1 and Table 2, composition of the sample is expressed by constitutional elements and rate of composition according to the above-described formula (formula 1).

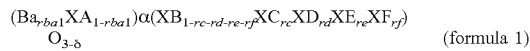
$$(Ba_{rba1}XA_{1-rba1})\alpha(XB_{1-rc-rd-re-rf}XC_{rc}XD_{rd}XE_{re}XF_{rf})O_{3-\delta} \quad \text{(formula 1)}$$

In the column of component phase, ○ indicates that it is a single phase of cubic perovskite phase, and X indicates that it contains a different phase such as $BaNiO_3$ type hexagonal structure. From Table 1 and Table 2, it can be confirmed that the crystal structure of materials within the scope of the first invention is a cubic perovskite structure stable even at a room temperature and is high in permeation rate of oxygen.

Second Invention

The second invention will be explained next.

In the second invention, the ceramic composition relating to the first invention and composite material to which it is applied can be used. However, the second invention is not limited to those.

As described above, improvement of oxygen permeation rate (synthetic gas production rate) per unit area requires conducting of three processes of a cathodic reaction, diffusion transfer of oxygen ion, and anodic reaction in co-ordination with each other.

In the second invention, the present inventors first paid attention to increase of a reaction field which is generally well-known as a method of promoting cathodic reaction to make an oxygen molecule in oxygen containing gas into oxygen ion namely increase of surface area obtained by addition of a porous catalyst layer. By allowing the porous catalyst layer including mixed conducting oxide to be contiguous to a second surface of the dense continuous layer, remarkable promotion of the cathodic reaction can be achieved. Mixed conductive perovskite oxide having high oxygen permeability is suited for material of the porous catalyst layer. As a result of assiduous search for the porous catalyst layer materials having high oxygen permeability, material composed of perovskite oxide whose composition is expressed by the composition formula (formula 2) was found.

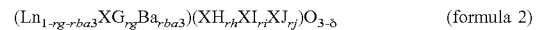
$$(Ln_{1-rg-rba3}XG_{rg}Ba_{rba3})(XH_{rh}XI_{ri}XJ_{rj})O_{3-\delta} \quad \text{(formula 2)}$$

(Where Ln denotes at least one kind of element selected from lanthanoide; XG denotes at least one kind of element selected from a seventh group consisting of Sr and Ca; XH denotes at least one kind of element selected from an eighth group consisting of Co, Fe, Cr, and Ga, in which the sum total of the number of moles of Cr and Ga is 0 to 20% to the sum total of the number of moles of the elements composing the above-described eighth group; XI denotes at least one kind of element selected from a ninth group consisting of Nb, Ta, Ti, Zr, In and Y, including at least one kind of element selected from a tenth group consisting of Nb, Ta, In and Y; and XJ denotes at least one kind of element selected from an eleventh group consisting of Zn, Li and Mg. As for the range of rba3, when XI contains only In, it fulfills the condition of $0.4 \leq rba3 \leq 1.0$, when XI contains only Y, it fulfills the condition of $0.5 \leq rba3 \leq 1.0$, and when XI contains only In and Y, it fulfills the condition of $0.2 \leq rba3 \leq 1.0$. The range of "rg+rba3" fulfills the condition of $0.8 \leq rg+rba3 \leq 1$, the range of rh fulfills the condition of $0<rh$, the range of ri fulfills the condition of $0<ri \leq 0.5$, the range of rj fulfills the condition of $0 \leq rj \leq 0.2$, and the range of "rh+ri+rj" fulfills the condition of $0.98 \leq rh+ri+rj \leq 1.02$. δ is a value determined to fulfill the condition of neutral electric charge.)

It is suitable to use perovskite structure oxide having high ion conductivity as a material, as is generally known, in order to increase the oxygen ion diffusion rate in the dense continuous layer. The present inventors have searched a material which has high ion conductivity and conformity with porous catalyst layer material and intermediate catalyst layer materials (no exfoliation occurs when sintering a porous layer, and so forth) as concrete materials and found material composed of perovskite oxide whose composition is expressed by formula 2, namely, material expressed by the same general formula as that of the porous catalyst layer is suitable, as a result after an assiduous activity.

On the other hand, concerning a method of promoting the anodic reaction in which hydrocarbon gas such as methane and the like is oxidized, the present inventors have found for the first time that a structure—in which a porous intermediate catalyst layer having mixed conducting oxide is allowed to be contiguous to a dense continuous layer, not that a conventionally well-known method of a porous reactive catalyst layer to be contiguous to the dense continuous layer, and the porous reactive catalyst layer is allowed to be contiguous to the dense continuous layer via the porous intermediate catalyst layer—is extremely effective to promote the anodic reaction. As material for the porous intermediate catalyst layer, high oxygen-permeable mixed conducting oxide having high reduction-resistance is suited so as to promote the anodic reaction stably even in a reducing atmosphere due to hydrocarbon or the like. As a result of assiduous search of mixed conductive, high oxygen-permeable perovskite oxide having reduction-resistance, the present inventors have found that perovskite oxide having the same composition as that of the porous catalyst layer or the dense continuous layer fulfills these conditions.

Besides, for the porous intermediate catalyst layer, it is also effective to include catalytic oxide not having mixed conductivity but having a combustion catalytic function, namely oxide containing one kind or two kinds or more among Co, Fe, Mn or Pd. The porous intermediate catalyst layer in the present invention may have both of these mixed conducting oxide and catalytic oxide or only mixed conducting oxide. For material for porous reaction catalyst layer, considering high temperature operation, as a result of assiduous search for the material not to react with perovskite oxide forming the porous intermediate catalyst layer, but have conformity with the porous intermediate catalyst layer material (no exfoliation occurs when bonding by calcination, and so forth), the present inventors have found that MgO having extremely low in reactivity is suitable for a catalyst support used for a reaction catalyst layer, and as a reaction catalyst, it is suitable to allow one or two or more active metal kinds selected from the group consisting of Ni, Co, Ru, Rh, Pt, Pd, Ir, and Re to be supported by a support. It should be noted that in the case of only porous intermediate catalyst layer containing mixed conducting oxide without a porous reactive catalyst layer, since a complete oxidation reaction of hydrocarbon is promoted as an anodic reaction, it is not suited to the production of synthetic gas. Therefore, this case is not included in the scope of the present invention.

The relation between what the present inventors intended and the prior art in the second invention is as follows. As for the porous catalyst layer and dense continuous layer (dense membrane portion) in the cathode side, there is no big structural difference from the prior art. However, material suited for this portion is disclosed concretely in the second invention. As for an anode side configuration, there is a big difference between the second invention and the prior art. The present inventors have invented a new method of dividing the anodic reaction into a complete oxidation reaction of hydrocarbon and a reforming reaction of the complete oxidation reaction product, and generating synthetic gas by a method of allowing these reactions to be promoted one by one in two contiguous layers.

By making the anodic reaction into two stages, it becomes possible for the first time to advance a partial oxidative reaction of hydrocarbon while obtaining stably a high oxygen permeation rate. The complete oxidation reaction of hydrocarbon is conducted through the mixed conductive porous intermediate catalyst layer. The mixed conducting oxide is suitable for a catalyst to advance the complete oxidation reaction rapidly. This is because mixed conducting oxide has a characteristic to advance the anodic reaction to convert oxygen ion diffusing through the dense continuous layer into oxygen atom on the surface of the dense continuous layer and the oxygen atom oxidatively decomposes the hydrocarbon molecule adsorbed on the catalyst surface immediately. It is necessary to make the intermediate catalyst layer to be porous because it makes the complete oxidation reaction rate high by increasing the reaction surface area, and exchange of raw material gas such as hydrocarbon and the like and water vapor and carbon dioxide as a reaction product are performed rapidly. For a reforming reaction (synthetic gas generation reaction) of hydrocarbon and the like with water vapor and carbon dioxide gas, it is advisable to use one kind or two kinds or more of active metal(s) selected from the group consisting of Ni, Co, Ru, Rh, Pt, Pd, Ir, and Re, known as a reforming reaction catalyst. However, it is necessary to widen reaction surface area so as to increase the reaction rate and to let a support hold the porous catalyst to make a porous reactive catalyst layer so that exchange of various gas of raw material gas such as hydrocarbon and the like, water vapor, carbon dioxide, synthetic gas and so on. The present inventors have not only invented the above-described new structure for the anodic reaction but also concretely disclosed material suited for this portion.

FIG. 1 is a sectional view showing a structure of composite material of catalyst and ceramics relating to a first embodiment of the second invention. In the first embodiment, a porous catalyst layer 2 is contiguous to a second surface 1a of a dense continuous layer 1. On the other hand, a porous intermediate catalyst layer 3 is contiguous to a first surface 1b of the dense continuous layer 1. Further, a porous reactive catalyst layer 4 is formed on a porous intermediate catalyst layer 3.

In the second invention, the multi-layered structure consisting of the porous catalyst layer, the dense continuous layer, the porous intermediate catalyst layer and the porous reactive catalyst layer may be formed on the porous substrate, as a covering layer. With this structure, since mechanical strength can be enhanced, resistance is increased in the case that the pressure on the cathode side and the pressure of raw material gas on the anode side differs from each other, and there is a difference in total pressure via the dense continuous layer. Any material can be accepted for the material of a porous substrate as long as it has mechanical strength and conformity with aforementioned multi-layered structure, for instance, even mixed conducting oxide can be accepted. Further, the porous catalyst layer may be made thick so as to also have functions as a porous substrate. Further, the porous substrate material can be formed from the ceramic composition relating to the first invention.

Figure 2:
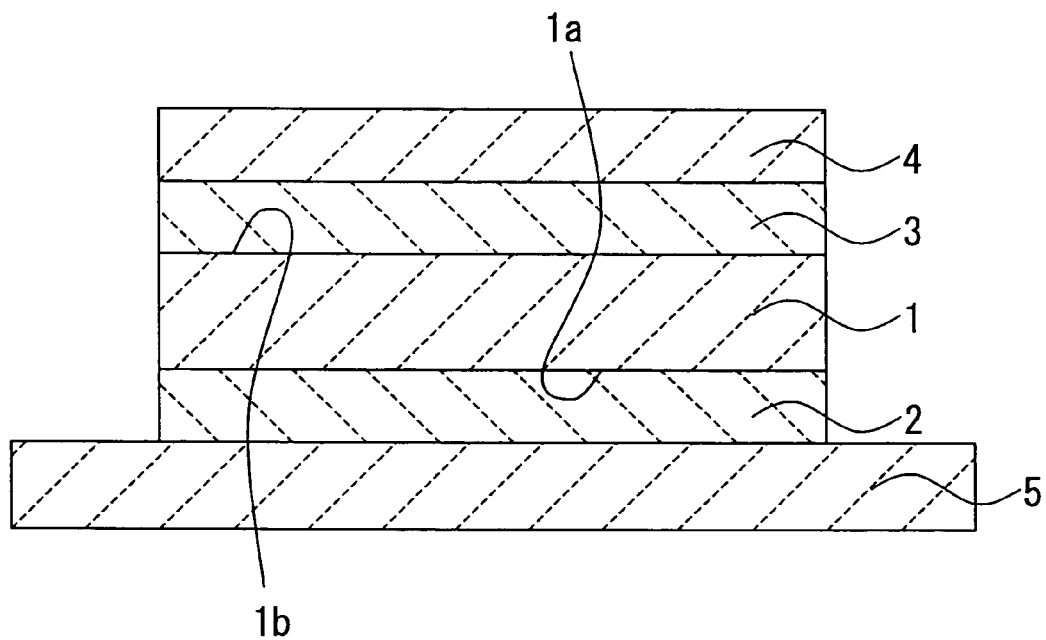
FIG. 2 is a sectional view showing a structure of a composite material of catalyst and ceramics relating to a second embodiment of the second invention.

FIG. 2 is a sectional view showing a structure of a composite material of catalyst and ceramics relating to a second embodiment of the second invention. In the second embodiment, the multi-layered structure is formed from the porous catalyst layer 2, the dense continuous layer 1, the porous intermediate catalyst layer 3 and the porous reactive catalyst layer 4, and this multi-layered structure is formed on the porous substrate 5, as a covering layer. To the porous substrate 5, for instance, the porous catalyst layer 2 is contiguous.

In the second invention, the thickness of the dense continuous layer is preferably 1 μm to 2 mm, more preferably 10 μm to 1.5 mm, much more preferably 30 μm to 1 mm. When the dense continuous layer is too thick, it becomes impossible to make the oxygen permeation rate large. On the contrary, when the dense continuous layer is too thin, mechanical reliability becomes poor. Accordingly, there is an appropriate range in the thickness of the dense continuous layer. Porosity of the aforementioned porous intermediate catalyst layer and porous catalyst layer is preferably 20% to 80%, more preferably 30% to 60%. If the porosity of the porous intermediate catalyst layer and the porous catalyst layer is too small, transfer of raw material gas and reaction product is blocked to hinder increase of oxygen permeation rate (synthetic gas production rate). On the other hand, if the porosity is too large, mechanical reliability becomes poor. Accordingly, the porosity has a suitable range as described before.

As material for the porous reactive catalyst layer material, as described above, it is desirable in view of activity and conformity with the porous intermediate catalyst layer to use a support having MgO as a main component and supporting one kind or two kinds or more of active metal selected from the group consisting of Ni, Co, Ru, Rh, Pt, Pd, Ir, and Re, which are active to hydrocarbon in reforming of water vapor and carbon dioxide. It should be noted that the porous reactive catalyst layer performs not only reforming of hydrocarbon but also an important role of avoiding formation of a hot spot which leads to material deterioration by transferring heat generated on the porous intermediate catalyst layer in which a complete oxidation reaction of hydrocarbon and the like occurs to the porous reactive catalyst layer (creation of an endothermic reaction).

Examples of production method for the porous catalyst layer, the dense continuous layer, the porous intermediate catalyst layer, and the reactive catalyst layer will be explained next.

For the raw materials for ceramics to form the porous catalyst layer, the dense continuous layer or the porous intermediate catalyst layer, metal salt such as metallic oxide, metal carbonate, and the like is used, and the raw materials are prepared by mixing and sintering the above-described materials. It is also acceptable for preparation of powdered materials to use co-precipitation method, metal alkoxide method (sol-gel method) or other methods for preparation equivalent to these methods. The mixed raw material powder is calcinated at a predetermined temperature. For the materials for forming the dense continuous layer, samples after calcinations are finely pulverized, mixed uniformly, and thereafter, molded. For the molding, any suitable ceramic production technology such as CIP (cold isostatical press), HIP (hot isostatical press), mold press, injection molding method, slip casting method, extrusion molding method, and so on can be applied. Molded sample is sintered at a high temperature.

For the porous catalyst layer and the porous intermediate catalyst layer material, the raw materials are prepared, mixed, calcinated and pulverized and sintered at high temperatures without molding, which is different from the production process for the dense continuous layer. If the raw materials are uniformly mixed, it is possible to sinter directly here, omitting the calcination process at the middle. It is necessary to conduct sintering at a temperature for sintering at which a perovskite structure displaying mixed conductivity can be created. The sintered sample is finely pulverized by a suitable method such as ball mills. The diameter of the pulverized powder is preferably 10 μm or less for the reason described later.

The porous catalyst layer and the porous intermediate catalyst layer are formed by mixing the pulverized powder and an organic solvent or the like to make a slurry which is then used to coat the dense continuous layer surface. The dense continuous layer is sintered (firing) after drying. Generally, the smaller and more uniform the particle size of the powder to be coated, or the thinner the coated membrane, the more uniformly it can be coated on the surface of membrane. More concretely, it is desirable to adjust the particle size of the powder to be 10 μm or less. For formation of the porous intermediate catalyst layer, a CVD (chemical vapor deposition) method, an electrophoresis method, a sol-gel method, or any other suitable method can be used other than the above-described method. The porous layer formed by these methods are sintered in a manner that the porous layer and the dense continuous layer are joined firmly in order to secure the continuity in mixed conductivity at the interface with the dense continuous layer. A suitable temperature for firing at which firm bonding is obtainable is determined to be below the melting point of the material lower in melting point of either the porous layer or the dense continuous layer. Among materials described in the embodiments or the like to be described later, firm bonding can be obtained at the sintering temperature of 950° C. or more.

As material for the catalyst forming the reactive catalyst layer, it is desirable to use a support having magnesia as a main component suuporting one kind or two kinds or more of active metal selected from the group consisting of Ni, Co, Ru, Rh, Pt, Pd, Ir, and Re. As a method of preparing a catalyst, any method of an impregnation holding method, an equilibrium adsorption method, a co-precipitation method or the like can be selected. A desirable amount of holding active metal is 3 to 30 mol % to the support in the case of Ni or Co, 0.1 to 10 wt % in the case of Ru, 0.01 to 3 wt % in the case of Rh, Pt, Pd, Ir and Re. Besides, it is possible to combine these metals. In order to disperse the active metal widely, Ni or Co may dissolve in magnesia. In this case, the co-precipitation method or a ceramic method may be used.

The reactive catalyst layer is formed by adding a minute amount of fine powder of the porous intermediate catalyst layer material to a minutely pulverized powder of a prepared catalyst to mix thoroughly. This mixture powder is then put into and mixed with an organic solvent or the like to make a slurry which is used to coat on the porous intermediate catalyst layer, which is sintered (fired) after dried to form the reactive catalyst layer. Generally, the smaller and more uniform the particle size of the powder to be coated, or the thinner the coated membrane, the more uniformly it can be coated on the surface of the membrane. More concretely, it is desirable to adjust the particle size of the powder to 10 μm or less. It is desirable to select the temperature for sintering to be a suitable temperature at which firm joining is obtainable, in the temperature range at least 50° C. higher than an actual operation temperature of the membrane reactor, but lower than the melting point of the composite material of ceramics, and sinter in the air. With the materials in the experiments described later, firm joining can be obtained at the sintering temperature of 950° C. or higher.

Amount by weight of the catalyst per unit membrane area is preferably in the range of 20 to 50 mg/cm². Depending on an operation condition of the membrane reactor, there is also a method of particle size adjustment of the reactive catalyst and arranging without sintering on the porous intermediate layer. Further, there is also a method of combining the slurry coating and particle size adjusted catalyst arrangement.

Experiments of the second invention will be explained next. However, this is only for explaining the second invention by using the experiment, and the scope of the second invention is not limited to this experiment.

Experiment 1 of the Second Invention

Commercially available powder of $SrCO_3$, $Fe_2O_3$, and $Nb_2O_5$ of purity 99% or more was weighed at a mole ratio of Sr:Fe:Nb=1:0.9:0.1, and wet mixing for 2 hours was conducted using a planetary ball mill. The obtained raw material powder was put into an alumina crucible and sintered for 5 hours at 1350° C. in the air to obtain a composite oxide. The measurement result of this composite oxide by powder X-ray diffraction at a room temperature showed that the main component was a cubic perovskite structure, and was confirmed to be composite oxide whose composition was expressed by $SrFe_{0.9}Nb_{0.1}O_{3-\delta}$. This composite oxide was crushed into powder having the particle size of 10 μm or less by an automatic mortar to obtain the porous intermediate catalyst layer material.

Next, commercially available powder of $BaCO_3$, $SrCO_3$, CoO, and $Fe_2O_3$ of purity 99% or more was weighed at a mole ratio of Ba:Sr:Co:Fe=0.5:0.5:0.8:0.2 and wet mixing for 2 hours was conducted using a planetary ball mill. The obtained raw material powder was put into an alumina crucible and calcinated for 20 hours at 950° C. in the air to obtain composite oxide. After the composite oxide was wet crushed into powder for 2 hours by a planetary ball mill and 3 g of this powder was molded into a disk at 25 MPa with a metal mold of 20 mm in diameter. After putting this molded body into an airtight bag, and the bag was deaerated into vacuum, this molded body was given CIP for 15 min, while pressurizing at 200 MPa, and sintered for 5 hours at 1130° C. in the air to obtain a dense sintered body having a relative density of 95% or more. The measurement result of this sintered body by powder X-ray diffraction at a room temperature showed that the main component was a cubic perovskite structure, and was confirmed to be composite oxide whose composition was expressed by $Ba_{0.5}Sr_{0.5}Co_{0.8}Fe_{0.2}O_{3-\delta}$. Both faces of the sintered body were ground and polished to be a disk of 12 mm in diameter, 0.7 mm in thickness, and used as a dense continuous layer.

Then, a sintered body obtained by the same method and expressed by a composition of $Ba_{0.5}Sr_{0.5}Co_{0.8}Fe_{0.2}O_{3-\delta}$ was pulverized into a powder of 10 μm or less in particle size to obtain the porous catalyst layer material. This material was suspended in an organic solvent to be a slurry state, which was coated on a second surface of the disk dense continuous layer. Further, the porous intermediate layer material described above was made in a slurry state similarly, which was coated on a first surface of the dense continuous layer. Then, after the dense continuous layer coated with two kinds of slurry was dried for 5 min at 120° C., the porous catalyst layer and the porous intermediate catalyst layer joined firmly with the dense continuous layer was obtained by sintering for 5 hours at 1050° C. in the air. At this time, the thickness of the porous catalyst layer and the thickness of the porous intermediate catalyst layer were 0.3 mm and 0.2 mm respectively. Next, 5 mg of fine powder of the porous intermediate catalyst layer material was added to 28 mg of powder (particle size of 10 μm or less) of hydrocarbon-reforming catalyst, in which Ni was dissolved in magnesia at a ratio of 10 mol % in regard to Mg and mixed thoroughly, which was suspended in an organic solvent, and slurry coated on the porous intermediate catalyst layer. This was dried at 120° C. for 5 minutes, and thereafter sintered at 1050° C. for 5 hours in the air, so that a catalyzed composite material of ceramics was obtained by joining the porous intermediate catalyst layer with the hydrocarbon-reforming catalyst layer (porous reactive catalyst layer). This composite material of ceramics was used for experiment of oxygen permeation (synthetic gas production).

The experiment was conducted by sandwiching the composite material of catalyst and ceramics with two pieces of mullite tubes via silver rings under a pressure of 10 atm at 900° C. while airtight of the cathode side and the anode side was kept. As for the raw material gas, air was supplied on the cathode side at a rate of 200 cc/min and methane was supplied on the anode side at a rate of 40 cc/min. An output gas on the anode side was measured with a gas chromatograph and an oxygen permeation rate from the air side to methane side in a stable state owing to element balance was calculated.

As a result of the experiment, the oxygen permeation rate was 21 cc/min/cm². At this time, the methane reaction conversion ratio, CO selection ratio (CO ratio in CO and $CO_2$), $H_2$/CO ratio were 58%, 80%, and 1.8, respectively. During the experiment, no crack and the like occurred in the dense continuous layer of composite material of catalyst and ceramics relating to experiment 1 in the second invention, and any symptom of time-varying destruction was not recognized at all. The composite material of catalyst and ceramics relating to this experiment showed a stable oxygen permeation (synthetic gas generation) rate excepting a period just after starting of experiment and any symptom of deterioration was not recognized.

Experiment 2 of the Second Invention

A suspension liquid was slurry coated on the porous intermediate catalyst layer of a disk-shaped composite body consisting of the porous catalyst layer, the dense continuous layer, and the porous intermediate catalyst layer obtained by the same method as that described in the experiment 1. The suspension liquid was prepared in a manner that 5 mg of fine powder of the porous intermediate catalyst layer material was added to 30 mg of power (particle size of 10 μm or less) hydrocarbon-reforming catalyst in which 5 mol % of Ni was impregnated and held in magnesia. This was mixed thoroughly and was suspended in an organic solvent. After a slurry coated composite body was dried at 120° C. for 5 min, a hydrocarbon reforming catalyst layer (porous reactive catalyst layer) was joined to the porous intermediate catalyst layer by sintering at 1050° C. for 5 hours in the air and a composite material of catalyst and ceramics was obtained.

An oxygen permeation experiment was conducted in a similar manner to that in experiment 1 except arranging, on the porous reactive catalyst layer of the composite material, 900 mg of hydrocarbon-reforming catalyst in which 2 wt % of Ru was impregnated and held into magnesia whose particle size was adjusted to 20/40 mesh and except the pressure is 1 atm.

The result of calculating the oxygen permeation rate in a stable state was 25 cc/min/cm². At this time, the methane reaction conversion rate, CO selection ratio (CO ratio in CO and $CO_2$), and $H_2$/CO ratio were 83%, 86% and 1.9 respectively. During the experiment, no crack and the like occurred in the dense continuous layer of composite material of catalyst and ceramics relating to experiment 2 in the second invention, and any symptom of time-varying destruction was not recognized at all. The composite material of catalyst and ceramics relating to the present experiment showed a stable oxygen permeation (synthetic gas generation) rate excepting a period just after starting of experiment and any symptom of deterioration was not recognized.

Experiment 3 of the Second Invention

Using the same manner as described in experiment 1, a composite material of catalyst and ceramics shown in Table 3 was manufactured and the oxygen permeation (synthetic gas production) characteristic was evaluated in the same method.

As a result, the oxygen permeation rate of 20 cc/min/cm₂ or more for all was obtained. As in the result of experiment 1, it showed a stable oxygen permeation (synthetic gas generation) rate and no symptom of deterioration and time-varying destruction was recognized at all.

Comparison 1 of the Second Invention

Using the similar manner to the method described in experiment 1, a composite material of catalyst and ceramics consisting of a porous catalyst layer and a dense continuous layer was obtained. Then, 900 mg of hydrocarbon-reforming catalyst in which 2 wt % of Ru was impregnated and held into magnesia whose particle size was adjusted to 20/40 mesh was arranged on the dense continuous layer to be used for an oxygen permeation experiment. The experiment was conducted in the same manner as shown in experiment 1 and the oxygen permeation rate in a stable state was calculated.

As a result, the oxygen permeation rate was 18 cc/min/cm$^2$. At this time, the methane reaction conversion rate, CO selection ratio (CO ratio in CO and $CO_2$), and $H_2$/CO ratio were 76%, 96% and 2.0 respectively.

Comparison 2 of the Second Invention

In a similar manner to the method described in experiment 1 except using a composite oxide expressed by $Ba_{0.5}Sr_{0.5}Co_{0.8}Fe_{0.2}O_{3-\delta}$ as a porous intermediate catalyst layer material, a composite material of catalyst and ceramics consisting of the porous catalyst layer, the dense continuous layer, and the porous intermediate catalyst layer is obtained. Then, 900 mg of hydrocarbon-reforming catalyst in which 2 wt % of Ru was impregnated and held into magnesia whose particle size was adjusted to 20/40 mesh was arranged on the porous intermediate catalyst layer to be used for an oxygen permeation experiment.

The experiment was conducted in the same manner as in the experiment 1, and an oxygen permeation rate of about 18 cc/min/cm$_2$ was obtained several hours after starting of the experiment. However, the oxygen permeation rate decreased while time elapsed, and a stable oxygen permeation rate could not be obtained.

Comparison 3 of the Second Invention

A suspension was slurry coated on a porous intermediate catalyst layer made of a disk-like composite material consisting of the porous catalyst layer, the dense continuous layer, and the porous intermediate catalyst layer obtained by a similar manner to the method described in experiment 1. The suspension is prepared by suspending, into an organic solvent, 30 mg of powder having a particle size of 10 μm or less of a hydrocarbon-reforming catalyst making an alumina (α type) support being impregnated and support 2 wt % of Ru. Then, after drying a composite body slurry-coated with the suspension for 5 minutes at 120° C., a hydrocarbon-reforming catalyst layer joined to a porous intermediate catalyst layer was obtained by sintering for 5 hours at 1050° C. in the air to be used for an oxygen permeation experiment. The experiment was conducted in a similar manner to the method described in experiment 1 except that the pressure applied was 10 atm.

As a result, an oxygen permeation rate of about 20 cc/min/cm$^2$ was obtained several hours after starting of the experiment. However, the oxygen permeation rate decreased while time elapsed, and a stable oxygen permeation rate could not be obtained.

Third Invention

The third invention will be explained next.

In the third invention, the ceramic composition relating to the first invention and the composite material applying the same can be also used in a similar manner as in the second invention, but the third invention is not limited to this, either.

The present inventors first studied concrete selection of dense ceramic membrane material, methane-reforming catalyst material and a most suitable combination thereof, with an intention to apply a mixed conducting oxide material low in reduction-resistance but high in oxygen permeation rate, which was conventionally said to be difficult to use for a partition membrane for a synthetic gas production, to a dense ceramic membrane in composite material of a catalyst for a partition membrane and ceramics. As a result, it was found it effective to combine perovskite structure mixed conducting oxide having a specific composition range of Nb and/or Ta being added to B site, as a dense ceramic membrane material, with a Ni-containing catalyst being supported on a support having a main component of magnesia, as methane-reforming catalyst material. Speaking more concretely, the present inventors found a material suitable as a partition membrane material for producing synthetic gas is composite material of catalyst and ceramics with a specific feature of having a structure that a catalyst portion containing a Ni-containing catalyst, a main component of a catalyst support being magnesia, is put to be contiguous to a first surface of a dense ceramic membrane consisting of mixed conducting oxide having a perovskite structure, the dense ceramic membrane being expressed by the composition of the formula (formula 2).

$(Ln_{1-rg-rba3}XG_{rg}Ba_{rba3})(XH_{rh}XI_{ri}XJ_{rj})O_{3-\delta}$ (formula 2)

(Where Ln denotes at least one kind of element selected from lanthanoide; XG denotes at least one kind of element selected from the seventh group consisting of Sr and Ca; XH denotes at least one kind of element selected from the eighth group consisting of Co, Fe, Cr, and Ga, in which the sum total of the numbers of moles of Gr and Ga is 0 to 20% to the sum total of the numbers of moles of the elements composing the above-described eighth group; XI denotes at least one kind of element selected from the ninth group consisting of Nb, Ta, Ti, Zr, In and Y, including at least one kind of element selected from the tenth group consisting of Nb, Ta, In and Y; and XJ denotes at least one kind of element selected from the eleventh group consisting of Zn, Li and Mg. As for the range of rba3, when XI contains only In, it fulfills the condition of $0.4 \leq rba3 \leq 1.0$, when XI contains only Y, it fulfills the condition of $0.5 \leq rba3 \leq 1.0$, and when XI contains only In and Y, it fulfills the condition of $0.2 \leq rba3 \leq 1.0$. The range of "rg+rba3" fulfills the condition of $0.8 \leq rg+rba3 \leq 1$, the range of rh fulfills the condition of $0 < rh$, the range of ri fulfills the condition of $0 < ri \leq 0.5$, the range of rj fulfills the condition of $0 \leq rj \leq 0.2$, and the range of "rh+ri+rj" fulfills $0.98 \leq rh+ri+rj \leq 1.02$. δ is a value determined to fulfill the condition of neutral electric charge.)

Figure 3:
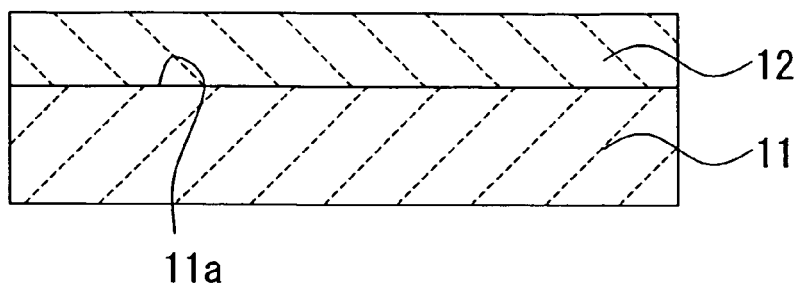
FIG. 3 is a sectional view showing a structure of a composite material of catalyst and ceramics relating to a first embodiment of a third invention.

FIG. 3 is a sectional view showing a structure of the composite material of catalyst and ceramics relating to a first embodiment of the third invention. In the first embodiment, a porous layer 12 as a catalyst portion is contiguous to a first surface 11a of a dense ceramic membrane 11.

The present inventors confirmed by experiment that the dense ceramic membrane made of the above-described composite material could maintain high oxygen permeability without causing crack or split at the time of preparation and without being deteriorated, destructed due to reductive expansion or the like, and could produce synthetic gas stably for a long period of time. For the reason why the above-described production can be realized by using the composite material of catalyst and ceramics relating to the third invention is thought to be as follows.

On the methane-containing gas side surface of the dense ceramic membrane being mixed conducting oxide, oxygen ion diffusedly permeating through the membrane is converted into oxygen atom or oxygen molecule, to react with methane (and hydrocarbon) component in the gas containing raw material methane and produce $CO_2$ and $H_2O$ by a complete oxidation reaction as shown in chemical formula (formula 3).

$$CH_4 + 4O \text{ (or } 2O_2) \rightarrow CO_2 + 2H_2O \quad \text{(formula 3)}$$

A thermodynamic oxygen partial pressure in a methane-containing gas atmosphere is determined by chemical equilibrium among CO, $CO_2$, $H_2$, $H_2O$, $CH_4$ and $O_2$, the larger the ratio of $CO_2$ and $H_2O$, the higher the partial pressure becomes, and on the contrary, the larger the ratio of CO, $H_2$, and $CH_4$ the lower the partial pressure becomes. For instance, when the ratio of $CO/CO_2$ and the ratio of $H_2/H_2O$ are about 0.01 or less at 900° C., the partial pressure of oxygen becomes about $10^{-10}$ to about $10^{-12}$ atm (about $1.013 \times 10^{-5}$ to about $1.013 \times 10^{-7}$ Pa) or more. However, when an ordinary methane-reforming catalyst exists, reactions expressed by the chemical formulas mentioned below (formula 4 and formula 5) immediately progress to produce CO and $H_2$, which makes the partial pressure of oxygen extremely low. In the case where the ordinary methane-reforming catalyst is contiguous to a dense ceramic membrane, since a reforming reaction progresses also in the vicinity of an interface between the dense ceramic membrane and methane-reforming catalyst to make the partial pressure of oxygen extremely low, when low reduction-resistant mixed conducting oxide is made a dense ceramic membrane, deterioration and destruction occur by reduction. The present inventors have experienced these deterioration and destruction many times by experiment.

$$CH_4 + H_2O \rightarrow CO + 3H_2 \quad \text{(formula 4)}$$

$$CH_4 + CO_2 \rightarrow 2CO + 2H_2 \quad \text{(formula 5)}$$

On the other hand, a Ni-containing catalyst being an essential constituent of composite material of catalyst and ceramics relating to the third invention displays a peculiar function. The Ni-containing catalyst functions as a methane-reforming catalyst only when Ni is in a metallic state, and does not display a reforming catalytic function when Ni is oxide. On the contrary, though catalytic activity of the Ni-containing catalyst is inferior to a mixed conducting oxide, it serves as an oxidation reaction catalyst. A condition that metal Ni is oxidized into oxide is determined by thermodynamics. For instance, at 900° C., under an partial pressure of oxygen of about $10^{-10}$ to about $10^{-12}$ atm (about $1.013 \times 10^{-5}$ to about $1.013 \times 10^{-7}$ Pa) or more, oxide becomes stable. Accordingly, when high oxygen-permeable mixed conducting oxide is made as a dense ceramic membrane, and the Ni-containing catalyst is made contiguous to this dense ceramic membrane, a partial pressure of oxygen in the vicinity of the interface between the dense ceramic membrane and the Ni-containing catalyst is kept as high as to oxidize the Ni-containing catalyst but very little CO or $H_2$ is produced in the vicinity thereof.

On the other hand, in the vicinity of a territory where the Ni-containing catalyst is exposed to raw material methane-containing gas, the partial pressure of oxygen becomes extremely low due to high $CH_4$ ratio in the gas, for instance at 900° C., it is far below of $10^{-12}$ atm (about $1.013 \times 10^{-7}$ Pa). Under such a circumstance, since Ni in a Ni-containing catalyst becomes a metallic state to serve as a methane-reforming catalyst, the reforming reactions expressed by the formula 4 and formula 5 progress to produce synthetic gas as a result. That is, a partial pressure of oxygen is relatively high on the dense ceramic membrane side in Ni-containing catalyst portion so that the reforming reaction is restrained, whereas on the raw material methane-containing gas side in the Ni-containing catalyst portion, a partial pressure of oxygen is extremely low so that the reforming reaction progresses. The complete oxidation reaction expressed by the formula 5 is an exothermic reaction while the reforming reactions expressed by the formulas 4 and 5 are endothermic reactions. In this endothermic reaction, most of heat of firing reaction generated in the vicinity of the interface between the dense ceramic membrane and the Ni-containing catalyst (where a complete oxidation reaction occurs) are absorbed on the raw material methane-containing gas side of the Ni-containing catalyst portion via a reforming reaction. In other words, the Ni-containing catalyst portion also has a function to let the heat go into the methane-containing gas side so as to restrain excessive temperature increase of the dense ceramic membrane leading to deterioration of material. In order to transfer the heat efficiently, the Ni-containing catalyst portion and the dense ceramic membrane must be contiguous to each other. In order to transfer the gas involved in the complete oxidative reaction and reforming reaction efficiently, the catalyst portion needs to be porous. It should be noted that a metal catalyst other than Ni which becomes oxide or metal at a partial pressure of oxygen having a similar value to that of Ni as a border are Co and Fe. However, these metals are unfavorable as a main active metal in the catalyst portion because of lowness in activity for a reforming catalyst. In the composite material of catalyst and ceramics relating to the third invention, it doesn't matter if it contains Co and Fe in the Ni-containing catalyst portion, but the main component should be always Ni.

As described previously, when the Ni-containing catalyst portion is made contiguous to the dense ceramic membrane, a partial pressure of oxygen near the interface between the dense ceramic membrane and the catalyst is kept moderately high. Therefore, in this case, reduction-resistance of mixed conducting oxide used for a dense ceramic membrane needs not to be so high compared with the case of making an ordinary methane reforming catalyst contiguous, and even with material having a medium level of reduction-resistance, there occurs neither deterioration nor destruction. Mixed conducting oxide, which is an essential constituent of the composite material of catalyst and ceramics relating to the third invention, whose composition is expressed by formula 2, and which has a perovskite structure, does not cause deterioration and destruction due to reduction even under conditions for producing synthetic gas when at least Ni-containing catalyst portion is contiguous to the mixed conducting oxide. Further, when a partial pressure of oxygen of raw material air-containing gas or oxygen-containing gas on the cathode side is high, this material does not lower oxygen permeation rate or does not destroy due to deterioration of the cathode side surface, even it is exposed to high-pressure air.

On the contrary, when material to be easily reduced such as $(Ba_{1-a}Sr_a)(Co_xFe_y)O_{3-\delta}$ is used for a dense ceramic membrane, even when a Ni-containing catalyst portion is made contiguous thereto, a production rate of synthetic gas gradually decreases and finally the membrane would be broken. The reason of relatively high reduction-resistance of the material expressed by formula 2 is thought that Nb, Ta, In, and Y contained in B site have a function to stabilize a perovskite structure intensively, and at the same time, Nb and Ta themselves have a strong affinity with oxygen ion, and Fe in B site has a similar effect, though the effect is smaller than those of Nb and Ta. In addition to the above, since this material has a characteristic of high oxygen permeability, a sufficient oxygen permeation rate, namely production rate of synthetic gas, can be obtained even with a thick membrane of 0.5 mm to 2 mm in thickness.

When the oxygen permeability of this material is desired to be especially high, it is preferable to adjust the value of rba to be 1.0 in formula 2.

When the composite material of catalyst and ceramics relating to the third invention is used as a self-supporting membrane, the thickness of the dense ceramic membrane is set to be in the range of 0.5 mm to 2 mm, more preferably in the range of 0.7 mm to 1.3 mm. If it is less than 0.5 mm in thickness, it is difficult to be a self-supporting membrane in view of mechanical strength. When the thickness exceeds 2 mm, it is undesirable because oxygen permeation rate, or production rate of synthetic gas is decreased. Further, in the composite material of catalyst and ceramics relating to the third invention, when the thickness of the dense ceramic membrane is less than 0.5 mm and difficult to be a self-supporting membrane, or when mechanical strength is intended to be reinforced as a partition membrane even the thickness is 0.5 mm or more, it is acceptable to take a thin membrane structure covered on a porous substrate.

Figure 4:
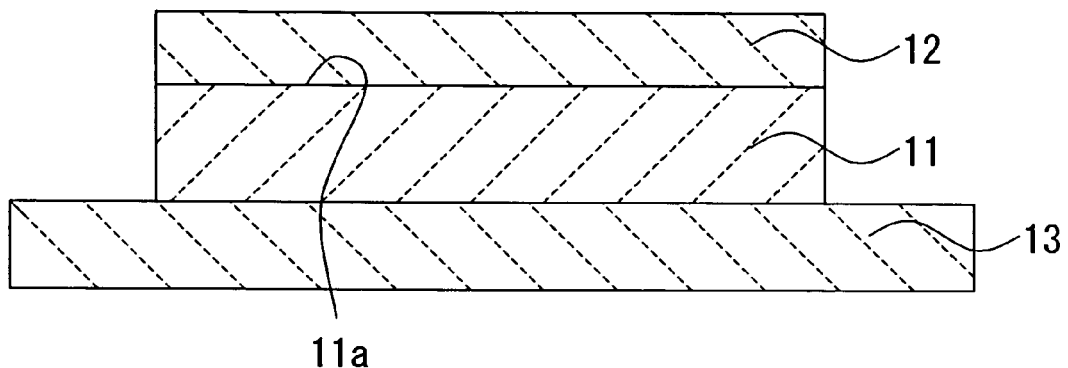
FIG. 4 is a sectional view showing a structure of a composite material of catalyst and ceramics relating to a second embodiment of the third invention.

FIG. 4 is a sectional view showing a composite material structure of catalyst and ceramics relating to a second embodiment of the third invention. In the second embodiment, a multi-layered structure is formed of a dense ceramic membrane 11 and a porous layer 12, and the multi-layered structure is formed as a covering layer on a porous substrate 13. To the porous substrate 13, for instance, the dense ceramic membrane 11 is contiguous.

In the event, as a material for the porous substrate, mixed conducting oxide, of which composition is expressed by formula 2 and which has a perovskite structure can be used, or another mixed conducting oxide material such as a ceramic composition relating to the first invention can be used. The former mixed conducting oxide is also used for, for instance, material for the dense ceramic membrane in the third invention. These porous substrate materials have a merit of being able to select material so that the thermal expansion coefficient is the same as or similar to that of a covering layer of the composite material of catalyst and ceramics relating to the third invention. As a porous substrate material, heat-resistant material different in thermal expansion coefficient, for instance, general ceramic material such as heat-resistant metal material, stabilized zirconia and the like can be used. However, in such a case, thermal expansion coefficient of the porous substrate in the thickness direction is changed in sequence by laminating layers different in thermal expansion coefficient, and the thermal expansion coefficient of a layer joined to a covering layer of composite material of catalyst and ceramics relating to the third invention finally needs to be the same as or similar to the thermal expansion coefficient of the covering layer of the composite material of catalyst and ceramics relating to the third invention.

In the composite material of catalyst and ceramics relating to the third invention, a main component of a catalyst support used for Ni-containing catalyst portion is magnesia. This is because, under the conditions of producing synthetic gas or in the air, magnesia has a specific property that it scarcely performs a solid-phase reaction with a mixed conductive material of the dense ceramic membrane or does not perform a solid-phase reaction at all. The present inventors confirmed this fact by mixing fully pulverized magnesia powder and powder of dense ceramic membrane material, by heat-processing it in the air or in a mixed gas of $CO_2$ and $H_2O$ for a long time at high temperatures, and by investigating the crystal structure of the heat-processed powder by a X-ray diffraction method after cooling it to a room temperature.

Since catalyst supports except this, for instance, an alumina support performs a solid-phase reaction with mixed conductive material, an oxygen permeation rate or a production rate of synthetic gas may be lowered, or the dense ceramic membrane may cause destruction. On the other hand, when a Ni-containing catalyst having magnesia as a main component of the catalyst support is used, such a problem does not arise even it is placed contiguous to the dense ceramic membrane.

As explained above in detail, basic structural features of the composite material of catalyst and ceramics of the third invention consists of the following four points.

(a) Perovskite structure mixed conducting oxide in the specific composition range having medium reduction resistance and high oxygen-permeability is used as dense ceramic membrane material.

(b) A catalyst support containing magnesia which does not react in a solid-phase reaction with the dense ceramic membrane material, preferably having magnesia as a main component is used.

(c) Ni, as a main component, which becomes oxide under a relatively high partial pressure of oxygen so as not to cause a methane reforming reaction, and becomes metal under a low partial pressure of oxygen to cause a methane reforming reaction is supported by the aforementioned catalyst support to be a catalyst portion.

(d) The aforementioned catalyst portion is made contiguous to the dense ceramic membrane. As a result, the partial pressure of oxygen in the vicinity of the interface between the catalyst portion and the ceramic membrane is appropriately increased so that reductive destruction of the dense ceramic membrane is prevented. A complete oxidative reaction of methane by a permeated oxygen component is made to progress, and then a reforming reaction of methane is made to progress on a raw material methane-containing gas side of the catalyst portion so that synthetic gas is produced.

In the third invention, it is a necessary requirement that the Ni-containing catalyst portion is contiguous to the dense ceramic membrane. If they are apart from each other, a partial pressure of oxygen in the vicinity of a surface on a raw material methane-containing gas side of the dense ceramic membrane becomes excessively high to make an oxygen permeation rate or a production rate of synthetic gas becomes extremely low. Further, the heat of combustion of the complete oxidative reaction caused on the surface of raw material methane-containing gas side becomes hard to transfer so that it might cause deterioration or destruction of the membrane due to excessive increase of membrane temperature. Furthermore, it is unfavorable that temperature of the catalyst portion is lowered to cause restraint of a reforming reaction, and increase of the ratio of $CO_2$ and $H_2O$ in the synthetic gas.

In order to make the distance between the Ni-containing catalyst portion and the dense ceramic membrane small, and cause a reforming reaction efficiently, it is preferable to make the Ni-containing catalyst portion 10 μm or less in average pore diameter, and 0.01 mm to 1 mm in thickness. And more preferably, it is effective to adopt a method of preparing a porous layer structure having a thickness of 0.1 mm to 0.5 mm to stack on the dense ceramic membrane to join the both firmly.

According to circumstances, it is effective to make a reforming catalyst portion adjusted to 0.5 mm or more in particle size (hereinafter referred to as a particle size adjusted reforming catalyst portion) contiguous to a Ni-containing catalyst portion having the aforementioned porous layer structure (hereinafter referred to as porous Ni-containing catalyst layer). Existence of the particle size adjusted reforming catalyst portion depends on a pressure of raw material methane-containing gas when synthetic gas is produced using composite material of catalyst and ceramics relating to the third invention as the partition membrane. When a pressure of the raw material methane-containing gas is 0.3 MPa or more, preferably 0.5 MPa or more, since a reforming reaction progresses rapidly even with a relatively small amount of catalyst, the particle size adjusted reforming catalyst portion is not necessarily required. However, since a particle size adjusted reforming catalyst portion in which particle size is adjusted to 0.5 mm or more hardly serves as resistance to gas flow, even when raw material methane-containing gas has a high pressure of 0.3 MPa or more, it is still usable though economically unfavorable. On the other hand, when a pressure of raw material methane-containing gas is 0.5 MPa or less, a reforming reaction may not progress sufficiently with a porous Ni-containing catalyst layer only, because the reforming reaction rate is relatively low. In such a case, the reforming reaction can be completed by making a particle size adjusted reforming catalyst portion contiguous to the Ni-containing catalyst portion. As a catalyst and a catalyst support of the particle size adjusted reforming catalyst portion, any material can be adopted so far as that being active to a reforming reaction and not giving any damage such as deterioration or destruction to the porous Ni-containing catalyst by a solid-phase reaction or the like, for instance, the same material as the Ni-containing catalystic portion can be used, or it is possible to use material of at least one or two kinds or more of metal(s) selected invariably containing Ni or Ru from Ni, Ru, Rh, Pd, Re, Os, Ir or Pt supported by a non-magnesia catalyst support. As an example of composite material of catalyst and ceramics of the present invention placing the particle size adjusted reforming catalyst portion in its neighbor, material that particles of a particle size adjusted reforming catalyst are filled in the inside of a catalized ceramic composite tube prepared by laminating a porous Ni-containing catalyst layer in the inside surface thereof (coated and fired to join firmly) can be cited.

The reason to limit the average pore size and thickness of the porous Ni-containing catalyst layer, and the particle size of the particle size adjusted reforming catalyst portion is as follows. When the average pore size of a porous Ni-containing catalyst layer exceeds 10 μm, it becomes mechanically weak, which makes it difficult to be put into practical use. On the contrary, a porous Ni-containing catalyst layer having an average pore size of 10 μm or less is mechanically strong. Further, when thickness of the porous layer is less than 0.01 mm, it is unfavorable because a sufficient catalytic function may not be obtained in the case when methane-containing gas has a pressure of 0.5 MPa or less, and sometimes it causes exfoliation when the thickness exceeds 1 mm. On the other hand, when the thickness is in the range of 0.01 mm to 1 mm, a relatively sufficient catalytic function can be obtained and the porous layer is hard to be peeled. Especially in the range of 0.1 mm to 0.5 mm in thickness, a sufficient catalytic function can be obtained, and no exfoliation occurs at all. The reason of limiting the particle size of the particle size adjusted reforming catalyst portion to be 0.5 mm or more is that if the particle size is less than 0.5 mm, a gas channel becomes narrow to serve as resistance against gas flow, and if the particle size adjusted reforming catalyst portion is thick, exchange of gases may not be performed rapidly, in other words, production of synthetic gas may be restrained.

Figure 5:
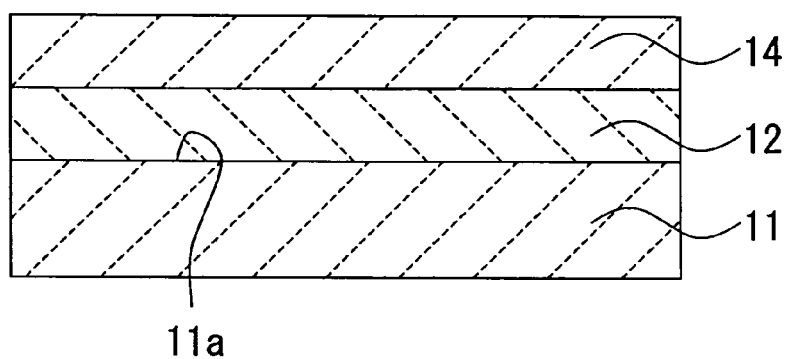
FIG. 5 is a sectional view showing a structure of a composite material of catalyst and ceramics relating to a third embodiment of the third invention.

FIG. 5 is a sectional view showing a structure of composite material of catalyst and ceramics relating to the third embodiment of the third invention. In the third embodiment, a reforming catalyst portion 14 is formed on a porous layer 12 being a catalyst portion.

The composite material of catalyst and ceramics relating to the third invention can keep high oxygen permeability without the dense ceramic membrane being destroyed by reductive expansion and the like to be able to produce synthetic gas stably for a long time. The thinner the dense ceramic membrane becomes, the more the oxygen permeation rate, or the production rate of synthetic gas increases. However, when it becomes thin to some extent, an interface reaction on the air (cathode) side approaches a rate-determining stage to restrain increase of the oxygen permeation rate. In such a case, it is effective to join firmly a porous layer consisting of mixed conducting oxide selected independently from material of the dense ceramic membrane, the composition being expressed by composition formula (formula 2) and having a perovskite structure, to the second surface (air-containing gas side surface) of dense ceramic membrane of the composite material of catalyst and ceramics relating to the present invention. Then, since a reaction area causing a cathodic reaction increases dramatically, it is possible to avoid rate determination of the cathodic reaction. This material has high activity to a cathodic reaction. Besides, this material does not deteriorate due to crystal transformation, and does not cause lowering of cathodic reaction rate even by being exposed to an atmosphere having a high partial pressure of oxygen such as high pressure air or the like. This is because Nb and/or Ta contained in B site is or are thought to have a function to forcibly stabilize the perovskite structure. Note that the dense ceramic membrane and the porous layer may be the same as or different from each other in composition so far as their compositions are expressed by the composition formula 2.

In the composite material of catalyst and ceramics relating to the third invention, porosity of the porous layer is preferably in the range of 20% to 80%, and more preferably 30% to 70%. As for thickness, it is preferable to be 0.001 mm to 5 mm, more preferably 0.01 mm to 1 mm, much more preferably 0.05 mm to 0.5 mm. If the porosity is set to be less than 20%, or if the thickness is set to be more than 5 mm, it is unfavorable because resistance against gas flow in the porous layer is increased, and increase of oxygen permeation rate, or production rate of synthetic gas is restrained. If the porosity exceeds 80%, it is unfavorable because the porous layer becomes mechanically weak and it becomes impossible to join the porous layer with the dense ceramic membrane material firmly. Further, when the thickness is less than 0.001 mm, since increase of a reaction area is not sufficient, the oxygen permeation rate, or the production rate of synthetic gas is not so different from the rate without the porous layer, and therefore, a promotion effect of the cathodic reaction, which is an aim with the porous layer, cannot be obtained.

In the composite material of catalyst and ceramic relating to the third invention, as a catalyst portion contiguous to the dense ceramic membrane, as explained before, material containing Ni as a main component of active metal is used to a catalyst support mainly composing of magnesia. As the Ni-containing catalyst, one kind or two kinds of element(s) selected invariably containing Ni from Ni and Mn is supported by a support mainly composed of magnesia by an impregnation holding method can be used, or as an average composition, a composition expressed by the composition formula (formula 6) can be used.

$$Ni_{rni}Mn_{rmn}Mg_{1-rni-rmn}O_c \quad \text{(formula 6)}$$

(Wherein the range of rni fulfills $0<rni\leq0.4$, the range of rmn fulfills $0\leq rmn\leq0.1$. c is a value determined to fulfill the condition of neutral electric charge.)

In the case of the former, it shows catalytic activity stably when a pressure of methane-containing gas is at least from a normal pressure to 2 MPa. In the case of the latter, the composition is a so-called solid solution catalyst in which Ni or $NiO_x$ is dissolved in magnesia in a solid solution state in a catalyst adjusting stage and becomes a hydrocarbon-reforming catalyst in a manner that a Ni-component is reduced to metal Ni by placing the same in a reductive circumstance. On the other hand, according to conditions of reaction such as the amount of water vapor introduced to methane-containing gas from outside being too small or like, Ni is excessively reduced, so that there arises a problem of growth of Ni particles which finally leads to increase carbon deposition property. For this problem, the present inventors confirmed by experiments that it is suitable to use a catalyst allowing Mn which is high in oxygen dissociation property to dissolve in a magnesia series catalyst in a solid-solution state, which is disclosed in Japanese Patent Application Laid-open 2000-288394 and the like. Generally, a solid solution catalyst is reduction-resistant but the present inventors found that the solid solution catalyst starts reduction and displays activeness as a hydrocarbon-reforming catalyst in the case of the aforementioned composition, by adopting a temperature to about 900° C. and a pressure of methane-containing gas to 0.5 MPa or more, and in the case of co-existing of one kind or two kinds or more of metal(s) selected from a group consisting of Ru, Rh, Pd, Re, Os, Ir and Pt in a range of 2 wt % or less, by setting a pressure of methane-containing gas to 0.3 MPa or more.

It is possible to reduce in a similar manner as described above even Mn is contained in a catalyst expressed by a formula $Ni_{rni}Mn_{rmn}Mg_{1-rni-rmn}O$, though it takes somewhat a long time. The aforementioned method of reduction has a merit that activation of the $Ni_{rni}Mn_{rmn}Mg_{1-rni-rmn}O$ catalyst can be performed only by placing a composite material of catalyst and ceramics relating to the third invention prepared by stacking $Ni_{rni}Mn_{rmn}Mg_{1-rni-rmn}O$ catalyst layer under synthetic gas producing conditions as a partition membrane, and increasing a pressure on the methane-containing gas side without reducing the dense ceramic membrane, and is suitable for the object of the third invention. In a solid solution catalyst obtained in a manner described above, Ni is dispersed in an extremely high state and catalytic activity is high and carbon precipitation property is low. However, since the catalytic activity is sometimes low when a pressure of methane-containing gas is less than 0.3 MPa, caution should be taken when in use.

In the case of Ni-supporting catalyst, a supporting amount in the range of 5 wt % to 40 wt % is preferable, and 10 wt % to 30 wt % is more preferable. This is because that the catalytic activity is insufficient at the supporting amount of less than 5 wt %, and the catalytic activity is saturated and the carbon precipitation property is increased at the supporting amount of more than 40 wt %.

The composition range of Ni and magnesia solid solution catalyst $Ni_{rni}Mn_{rmn}Mg_{1-rni-rmn}O$ is $0<rni\leq0.4$, and $0\leq rmn\leq0.1$ as described above. The values of rni and rmn are preferably in the range of $0.05<rni\leq0.3$, and $0\leq rmn\leq0.08$ respectively, and more preferably in the range of $0.1\leq rni\leq0.2$, and $0\leq rmn\leq0.06$. This is because in the case of $rni>0.4$, the catalytic activity is saturated and the carbon precipitation property is increased.

In the composite material of catalyst and ceramics relating to the third invention, as a catalyst other than the above, for instance, the following materials can be used.

(e) It is possible to use a catalyst portion including material supporting one kind or two kinds of element(s) selected invariably containing Ni from Ni and Mn on a support mainly composed of magnesia or a composition expressed by formula 6 as an average composition, and a composite oxide, whose composition is expressed by formula 2 and selected independent of the dense ceramic membrane or porous material.

(f) It is possible to use a catalyst portion including material supporting one kind or two kinds of element(s) selected invariably containing Ni from Ni and Mn on a support mainly composed of magnesia or a composition expressed by formula 6 as an average composition, further supporting one kind or two kinds or more of metal selected from a group consisting of Ru, Rh, Pd, Re, Os, Ir and Pt in the range of 2 wt % or less.

(g) It is possible to use a catalyst portion including material supporting one kind or two kinds of element(s) selected invariably containing Ni from Ni and Mn on a support mainly composed of magnesia or a composition expressed by formula 6 as an average composition, further supporting one kind or two kinds or more of metal selected from a group consisting of Ru, Rh, Pd, Re, Os, Ir and Pt in the range of 2 wt % or less, and a composite oxide, whose composition is expressed by formula 2 and selected independently from the dense ceramic membrane or porous material.

The composite oxide expressed by formula 2 described in (e) serves as an oxidative catalyst of hydrocarbon such as methane and the like and produces $CO_2$ and $H_2O$. Accordingly, a partial pressure of oxygen near the interface between the dense ceramic membrane and catalyst portion becomes moderately high, serving to prevent deterioration and destruction of the dense ceramic membrane. Since Ni-containing catalyst of which catalyst support is mainly composed of magnesia is difficult to cause a solid-phase reaction between magnesia and dense ceramic membrane, they sometimes do not join successively or firmly when stacking them (when being contiguous to each other). However, the composite oxide expressed by formula 2 also has a function to join the catalyst portion and the dense ceramic membrane more firmly. Since the composite oxide expressed by formula 2 contains Nb, Ta, In and Y, it is excellent in reduction-resistance. When the reduction-resistance is especially enhanced, it is recommendable to increase the content of Nb, Ta, In, Y and Fe within a predetermined compositional range. When the defined compositional range is exceeded, it is unfavorable because the function and reduction-resistance as an oxidation catalyst are lowered.

The one kind or two kinds or more of metal(s) selected from the group consisting of Ru, Rh, Pd, Re, Os, Ir and Pt described in (f) serve(s) as a highly active reforming catalyst to hydrocarbon, and produces CO and $H_2$ from hydrocarbon such as methane or the like, $CO_2$ and $H_2O$ at a high rate. Accordingly, these metals increase a production rate of synthetic gas more compared to the case when active metal is Ni alone. However, since all metals are expensive noble metals, it is necessary to determine the supporting amount to be minimum, and it is preferable for the supporting amount to be 2 wt % or less, more preferably 1 wt % or less, and much more preferably 0.5 wt % or less. It should be noted that since a Ni-containing catalyst in which a main component of the catalyst support is magnesia is hard for magnesia to perform a solid-phase reaction with the dense ceramic membrane, it sometimes does not join successfully (put to be contiguous) when stacking, but the above-described supporting metal also has a function to join the catalyst portion and the dense ceramic membrane more firmly.

The catalyst portion described in (g) is a combination of (e) with (f), and it has a specific feature of high production rate of synthetic gas. Other specific features, operation, requirement and so on are as explained before.

As already explained, it is possible to produce synthetic gas with high energy efficiency, at low cost, and stably for a long period of time by using a partition membrane consisting of the composite material of catalyst and ceramics of the third invention, and making the catalyst portion side under methane-containing gas atmosphere, and the opposite side thereof under air or oxygen-containing gas atmosphere. A desirable production method is to set a temperature normally to 850° C. or more, preferably about 900° C., and adopt the following conditions.

(h) When a porous layer structure (porous Ni-containing catalyst layer) having a Ni-containing catalyst portion of 10 μm or less in average pore diameter and 0.01 mm to 1 mm in thickness is joined to the first surface firmly, a pressure of methane-containing gas on the catalyst portion side is set to 0.3 MPa or more.

(i) When a porous layer structure (porous Ni-containing catalyst layer) having a Ni-containing catalyst portion of 10 μm or less in average pore diameter and 0.01 mm to 1 mm in thickness is joined to the first surface firmly, and further, a reforming catalyst portion (particle size adjusted reforming catalyst portion) whose particle size is adjusted to 0.5 mm or more is placed contiguous to the above-described porous layer structure, a pressure of methane-containing gas on the catalyst portion side is set to 0.5 MPa or less.

(j) Water vapor is allowed to contain in methane-containing gas from outside, and the concentration ratio of the water vapor to methane is set in the range of 2 or less.

The reason of the conditions (h) being desirable is no particle size adjusted reforming catalyst portion is required because the reforming reaction can be advanced rapidly even with a comparatively small catalyst, when a pressure of the raw material methane-containing gas is 0.3 MPa or more, or preferably 0.5 MPa or more.

The reason of the conditions (i) being desirable is because when the raw methane-containing methane gas is 0.5 MPa or less, a reforming reaction rate is relatively slow, and it is necessary to complete the reforming reaction by making the reforming reaction advance also in the particle size adjusted reforming catalyst portion in addition to the porous Ni-containing catalyst layer. When the raw material methane-containing gas is 0.5 MPa or less, the content of CO and $H_2$ contained in synthetic gas sometimes becomes low unless doing so. It should be noted that when the raw material methane-containing gas is 0.5 MPa or less, a carbon precipitation reaction to be described later is hard to occur, and therefore, no remarkable precipitation of carbon occurs even the particle size adjusted reforming catalyst portion is placed to be contiguous. As a particle size adjusted reforming catalyst portion, various Ni-containing catalytic materials already explained as the essential constituents of the composite material of catalyst and ceramics relating to the third invention, and/or one kind or two kinds or more of metal(s) selected invariably containing Ni or Ru from the group consisting of Ni, Ru, Rh, Pd, Re, Os, Ir, or Pt which is supported by a non-magnesia catalyst support, can be used. These are high in ability as a reforming catalyst.

The reason of the conditions (j) being desirable is to restrain a carbon precipitation reaction which may occur as a sub-reaction on the reforming catalyst for hydrocarbon such as methane or the like (a Ni-containing catalyst portion, a porous Ni-containing catalyst layer, or a particle size adjusted reforming catalyst portion in the third invention). Since the carbon precipitation reaction easily occurs when a methane-containing gas pressure gets high, the conditions (j) are useful especially when producing synthetic gas under the conditions of (h). When the concentration ratio of water vapor and methane exceeds 2, precipitation of carbon is restrained. However, it is unfavorable because a Ni catalyst is easy oxidized in a wide area of the Ni-containing catalyst portion, which leads to increase of the partial pressure of oxygen near the dense ceramic membrane surface to result in lowering of oxygen permeation rate. On the contrary, when the concentration ratio of water vapor and methane is 2 or less, such a thing does not occur and synthetic gas can be produced while a carbon precipitation reaction is being restrained.

Next, an example of production method of third invention-related material will be explained. The raw material of dense ceramic membrane is prepared by using metallic oxides or metal salts such as carbonates, and by mixing and sintering them. For preparation of powder material, it is acceptable to use a co-precipitation method, a metal alkoxide method (sol-gel method), or method of preparation equivalent to these methods. Mixed raw material powder is calcinated at a predetermined temperature, and the sample after calcination is finely pulverized and molded after the pulverized powder is uniformly mixed. For the molding, any suitable ceramic production technology such as CIP (cold isostatical press), HIP (hot isostatical press), mold press, injection molding method, slip casting method, extrusion molding method, and so on can be applied, and a molded sample is sintered at high temperatures.

The porous layer is prepared by main sintering at high temperatures without molding which is different from the dense ceramic membrane, after preparation of raw material, mixing, calcinations and crushing. It is also acceptable to omit the intermediate calcination and perform main sintering directly if the raw material is uniformly mixed. At the time of main sintering, it is necessary to adopt a sintering temperature which realizes a perovskite structure to display mixed conductivity. The sintered sample is finely powdered by an appropriate method such as a ball mill or the like.

The porous layer is formed by slurry-coating with the above-described sample using an organic solvent or the like to cover the dense continuous layer surface. Generally, the uniformly smaller the particle size of the powder applied by coating or the thinner the powder, the more uniformly the powder can be attached on the membrane surface. As a molding method other than these described above, CVD (chemical deposition) method, electrophoresis, sol-gel method, or any other suitable methods can be used. The porous layer formed by these methods is sintered so as to join the porous layer and the dense ceramic membrane firmly to ensure continuity in mixed conductivity on the interface with the dense ceramic membrane. As the sintering temperature, a suitable temperature is selected, which is below the melting point of either material for the porous layer or for the dense ceramic membrane having a melting point lower than the other, and the temperature at which firm joining can be obtained.

Ni-containing catalyst is prepared by a co-precipitation method, ceramics method, or the like, and when minute amount of noble metals such as Ru, Rh, Pd, Re, Os, Ir, Pt and so on is supported to the Ni-containing catalyst, a suitable method is selected from an impregnation holding method, an equilibrium adsorption method and so on.

In order to join the catalyst firmly on the surface of the dense ceramic membrane, fine powder of the composite oxide expressed by formula 2 is added to the finely pulverized powder of the catalyst prepared as above, and mixed thoroughly. The mixture is suspended in an organic solvent or the like, the suspension is slurry-coated on the dense ceramic membrane surface, and it is desirable to sinter it in the air at a temperature at least 50° C. higher than the actual operation temperature of a membrane reactor and below the melting point of the ceramic material. At this time, the fine powder of the composite oxide is preferably 0.1 or less in mole ratio to the prepared catalyst described above, more preferably, 0.05 or less, and much more preferably 0.03 or less. The weight of the catalyst after firing per unit membrane area is suitably 20 to 50 mg/cm$^2$. In order to adjust the particle size of the catalyst, a suitable method such that finely crushed powder is pressed, pulverized and then the particle size is made uniform with a sieve, and so on is selected.

The production method described above relates to making a self-supporting membrane of material of the present invention. Hereinafter, a production method of joining the material of the present invention to a porous substrate as a covering layer will be explained. For the production of a porous body according to the present invention, a ceramics method, co-precipitation method, alkoxide method and so on usually used for producing a ceramics porous body can be used. Sintering of the porous body is usually performed by dividing it into two steps of calcinating and main firing (sintering). As for calcination temperature range, it is usually conducted in the range of 400 to 1000° C., for from several hours to ten and several hours. The calcinated powder can be molded directly and sintered, or can be mixed with resin such as polyvinyl alcohol (PVA) and the like, molded and sintered. While the main sintering temperature is usually a maximum heat treatment temperature for producing the porous body, the main sintering temperature of the porous body provided by the present invention is in the range of 700 to 1450° C., preferably in the range of 1000 to 1350° C. For the sintering, it usually requires several hours or more. As an atmosphere for the main sintering, it is usually sufficient to be conducted in the air, but it is acceptable to sinter under a controlled atmosphere as necessary. As a molding method for the porous body, it is possible to pack the calcinated powder or mixed powder into a die similarly to a typical bulk ceramics production, pressurize and mold. It is also possible to use a slurry casting method, extrusion molding method, and the like.

On the other hand, the dense ceramic membrane can be produced by a typical method for producing a ceramic membrane. It is possible to make the membrane by a so-called thin film forming method such as PVD or CVD of a vacuum deposition method and the like. However, it is preferable from economical point of view to apply coating on the porous body with a slurried raw material powder or calcinated powder and to sinter. Usually, the temperature of sintering the dense ceramic membrane corresponds to the maximum heat treatment temperature for membrane production. However, it is also required to make the membrane dense lest gas leakage should occur, and select a condition under which porosity of the porous body is not greatly lowered during the sintering process. For this reason, the sintering temperature of the dense ceramic membrane is preferably about densification temperature of the material constituting the membrane, and for the sintering, several hours are usually required. A method of joining the catalyst firmly on the dense ceramic membrane surface is conducted similarly to the case of the self-supporting membrane.

Next, an embodiment of the third invention will be explained. However, this is purely for the purpose of explaining an experiment, and the scope contained in the third invention is not limited to this content.

Experiment 1 of the Third Invention (Preparation of Material)

Commercially available powder of $BaCO_3$, $CoO$, $Fe_2O_3$ and $Nb_2O_5$ having purity of 99% or more was weighed to be a mole ratio of Ba:Co:Fe;Nb=1:0.7:0.2:0.1, and wet mixed for two hours using a planetary ball mill. Obtained material powder was put in a crucible made of alumina, and calcinated at 950° C., for 20 hours in the air to obtain composite oxide. After the composite oxide was wet pulverized for two hours with a planetary ball mill, 3 g of the powder was molded in a disk shape at 25 MPa with a mold of 20 mm in diameter. The molded body was put in an airtight bag and degassed to make a vacuum. Then while applying pressure to 200 MPa, CIP was given for 15 minutes, and main sintering was conducted for 5 hours at 1130° C. to obtain a densified sintered body having a relative density of 95% or more. A result of performing powder X-ray diffraction measurement of the sintered body at room temperature showed that its main component is a cubic perovskite structure and it was confirmed that it is a composite oxide expressed by the composition of $BaCO_{0.7}Fe_{0.2}Nb_{0.1}O_{3-\delta}$. Both sides of the sintered body was ground and polished to make a disk shape of 12 mm in diameter, and 0.7 mm in thickness to be used as a dense ceramic membrane. The same sintered body as that described above, expressed by a composition of $BaCO_{0.7}Fe_{0.2}Nb_{0.1}O_{3-\delta}$ was pulverized and suspended in an organic solvent to be a slurry and applied on the dense ceramic membrane surface. After drying this for 5 minutes at 120° C., a dense ceramic membrane (ceramic membrane A) to which a porous layer firmly joined with a dense ceramic membrane surface was added, was obtained by sintering for five hours at 1050° C. in the air.

A mixed aqueous solution of nickel acetate and magnesium nitrate was prepared to obtain a mole ratio of Ni:Mg=0.1:0.9, and by adding a potassium carbonate aqueous solution, precipitate consisting of two components of nickel and magnesium was produced. After filtrating the precipitate and washing it, the precipitate is dried for 12 hours or more at 120° C. in the air. Then, it was sintered for 20 hours at 1000° C. in the air to obtain a nickel and magnesia catalyst (catalyst A) expressed by $Ni_{0.1}Mg_{0.9}O$.

Commercially available powder of $SrCO_3$, $Fe_2O_3$ and $Nb_2O_5$ having purity of 99% or more was weighed to be a mole ratio of Sr:Fe:Nb=1:0.9:0.1, and wet mixed for two hours using a planetary ball mill. Obtained material powder was put in a crucible made of alumina, and calcinated at 1350° C., for 5 hours in the air to obtain composite oxide. A result of performing powder X-ray diffraction measurement of the composite oxide at room temperature showed that its main component is a cubic perovskite structure and it was confirmed that it is a composite oxide expressed by the composition of $SrFe_{0.9}Nb_{0.1}O_{3-\delta}$. The composite oxide was wet pulverized for two hours with a planetary ball mill to obtain composite oxide for methane reforming catalyst lamination layer.

The composite oxide for methane reforming catalyst lamination layer was added to fine powder of the catalyst A at a mole ratio of 0.02 and mixed thoroughly and thereafter, the mixture was suspended in an organic solvent to slurry-coat on the surface of the opposite side to the porous layer of the ceramic membrane A. After drying this for 5 minutes at 120° C., the composite material A of catalyst and ceramics which was prepared by joining a methane reforming catalyst firmly on the dense ceramic membrane surface by sintering for 5 hours at 1050° C. in the air was obtained. At this time, weight of the catalyst per unit surface area of the ceramic membrane was 30 mg/cm².

Experiment 2 of the Third Invention (Material Preparation)

Commercially available powder of $BaCO_3$, $SrCO_3$, CoO, $Fe_2O_3$ and $Ta_2O_5$ having purity of 99% or more was weighed to be a mole ratio of Ba:Sr:Co:Fe:Ta=0.8:0.2:0.7:0.2:0.1, and a dense ceramic membrane expressed by the composition of $Ba_{0.8}Sr_{0.2}Co_{0.7}Fe_{0.2}Ta_{0.1}O_{3-\delta}$ was obtained in a similar manner as in experiment 1. Further, a dense ceramic membrane (ceramic membrane B) to which a porous layer firmly joined to a dense ceramic membrane surface expressed by the composition of $Ba_{0.8}Sr_{0.2}Co_{0.7}Fe_{0.2}Ta_{0.1}O_{3-\delta}$ was added in a similar manner as in experiment 1. Then, on a surface opposite to the porous layer of the ceramic membrane A, a methane reforming catalyst is firmly joined using a similar method to experiment 1 to obtain a composite material B of catalyst and ceramics.

Experiment 3 of the Third Invention (Material Preparation)

Using a similar manner to experiment 1 except that oxide for methane reforming catalyst lamination layer (composite oxide expressed by the composition of $SrFe_{0.9}Nb_{0.1}O3-\delta$ in experiment 1) is not used on a surface (a first surface) opposite to the porous layer of the ceramic membrane 1 described in experiment 1, a methane reforming catalyst was sintered on the surface of a ceramic membrane and it was confirmed that Ni-containing catalyst portion was joined to a dense ceramic membrane. However, the bonding strength was rather small compared to that of the composite material A of catalyst and ceramics, and a function of bonding strengthening due to co-existing of oxide for methane reforming catalyst lamination layer was recognized.

Experiment 4 of the Third Invention (Experiment of High-pressure Synthetic Gas Production)

The composite material A of catalyst and ceramics was sandwiched between a metal tube (made of Inconel 600, providing a slit-shape gas exhaust port on the composite material side of catalyst and ceramics of the tube) and a mullite pipe to be installed on an experimental apparatus. At this time, a silver O ring was disposed between the mullite pipe and the above-described composite material of catalyst and ceramics, and they were heated to about 950° C. in an electric oven to fuse them so that airtightness between the mullite pipe and the composite material of catalyst and ceramics was ensured. The production experiment of synthetic gas was carried out as follows. 200 cc/min of air was fed from a charging tube inside a metal tube under the conditions of temperature at 900° C., with a pressure of 10 atm (about $1.013 \times 10^{-4}$ Pa), and 60 cc/min of methane was fed from a charging tube inside the mullite pipe. Then, a reaction product on the methane side was analyzed by gas chromatography. The element balance was applied to the composition of the product measured by gas chromatography, and a stable oxygen permeation rate after 100 hours of elapsed time from beginning of the experiment from air side to methane side was calculated.

As a result, an oxygen permeation rate was 20 cc/min/cm². At this time, reaction conversion ratio of methane, CO selection ratio (CO ratio in CO and $CO_2$), $H_2$/CO ratio were 54%, 80%, and 2.0, respectively. Change in quality of the material used, and carbon precipitation on the catalyst were not observed after the experiment.

Comparison 1 of the Third Invention (Experiment of High-Pressure Synthetic Gas Production)

A production experiment of synthetic gas was carried out in a similar manner to experiment 4 except mixing 150 cc/min of water vapor into methane. As a result of calculating a stable oxygen permeation rate after 100 hours of elapsed time from beginning of the experiment, it was found to be 8 cc/min/cm². Change in quality of the material used, and significant carbon deposition on the catalyst was not observed after the experiment.

Experiment 5 of the Third Invention (Experiment of High-Pressure Synthetic Gas Production)

A production experiment of synthetic gas was carried out in a similar manner to experiment 4 except using the composite material B of catalyst and ceramics. As a result of calculating a stable oxygen permeation rate after 100 hours of elapsed time from beginning of the experiment, it was found to be 19 cc/min/cm². At this time, reaction conversion ratio of methane, CO selection ratio (CO ratio in CO and $CO_2$), $H_2$/CO ratio were 52%, 81%, and 2.0, respectively. Change in quality of the material used, and carbon precipitation on the catalyst were not observed after the experiment.

Comparison 2 of the Third Invention (Experiment of High-Pressure Synthetic Gas Production)

Commercially available powder of $BaCO_3$, $SrCO_3$, CoO, and $Fe_2O_3$ having purity of 99% or more was weighed to be a mole ratio of Ba:Sr:Co:Fe=0.5:0.5:0.8:0.2, and a dense ceramic membrane expressed by the composition of $Ba_{0.5}Sr_{0.5}Co_{0.8}Fe_{0.2}O_{3-\delta}$ was added was obtained in a similar manner as in experiment 1. Further, a dense ceramic membrane (ceramic membrane C) to which a porous layer firmly joined to a dense ceramic membrane surface expressed by the composition of $Ba_{0.5}Sr_{0.5}Co_{0.8}Fe_{0.2}O_{3-\delta}$ was added was obtained in a similar manner as in experiment 1.

Commercially available powder of $SrCO_3$, CoO, and $Fe_2O_3$ having purity of 99% or more was weighed to be a mole ratio of Sr:Co:Fe=1:0.8:0.2, and a dense ceramic membrane expressed by the composition of $SrCo_{0.8}Fe_{0.2}O_{3-\delta}$ was obtained in a similar manner as in experiment 1. Further, a dense ceramic membrane (ceramic membrane D) to which a porous layer firmly joined to a dense ceramic membrane surface expressed by the composition of $SrCo_{0.8}Fe_{0.2}O_{3-\delta}$ was added was obtained in a similar manner as in experiment 1.

Commercially available $Al_2O_3$ powder having purity of 99% or more was sintered for 5 hours at 1100° C. in the air to obtain α-alumina, which was wet-pulverized with a planetary ball mill to serve as a catalyst support. Then, the catalyst support was immersed in a nickel nitrate aqueous solution to hold Ni as a Ni-impregnated support. Subsequently, after Ni-impregnated catalyst support was dried thoroughly in the air, it was sintered for 5 hours at 1000° C. in the air to obtain a catalyst (catalyst B) expressed by Ni 10 wt $\%/Al_2O_3$.

By adding a potassium carbonate aqueous solution to a magnesium nitrate aqueous solution, a precipitate composing of magnesium component is generated. After the precipitate was filtered and washed, it was dried for 12 hours at 120° C. in the air. Thereafter, it was sintered for 2 hours at 1000° C. in the air, and used as a catalyst support. Then, it was immersed in a ruthenium (III) chloride aqueous solution for 20 hours while keeping pH constant by a magnesium hydroxide aqueous solution, and Ru was adsorbed in equilibrium to the catalyst support and filtrated to obtain a Ru-adsorbed catalyst support. Next, after the Ru-adsorbed catalyst support was thoroughly dried in the air, it was sintered for 5 hours at 1000° C. in the air to obtain a catalyst (catalyst C) expressed by a formula Ru 2 wt %/MgO.

As for combinations shown in Table 4 relating to ceramic membranes A to D and catalysts A to D, composite materials of catalyst and ceramics were prepared in a similar manner to experiment 1 except that no oxide for methane reforming catalyst lamination layer was used, and a production experiment of synthetic gas was carried out in a similar manner to experiment 4 using these materials. As a result, the oxygen permeation rate was reduced in all cases during period of time, and could not obtain a stable oxygen permeation rate within 100 hours after the experiment began.

Experiment 6 of the Third Invention (Production Experiment of Medium Pressure Synthetic Gas)

Fine powder of the catalyst A is immersed in an acetone solution of rhodium acetylacetonade and acetone was vaporized at 70° C. Thereafter, it was dried for 12 hours or more at 120° C., and the catalyst (catalyst D) expressed by Rh 1 wt $\%/Ni_{0.1}Mg_{0.9}O$ was obtained. Then, the catalyst D was finely pulverized, and pressed under a pressure of 2 ton/cm² (about $1.96 \times 10^8$ Pa). Thereafter, the particle size was adjusted to 20/40 mesh to obtain the particle size adjusted catalyst A.

Similarly to experiment 1 except using the catalyst D instead of the catalyst A, a composite material C of catalyst and ceramics in which a methane reforming catalyst was firmly joined on the dense ceramic membrane surface was obtained. Then, 950 mg/cm₂ of the particle size adjusted catalyst A was filled on the methane reforming catalyst layer side of the composite material C of catalyst and ceramics disposed in an experimental apparatus, and a production experiment of synthetic gas was carried out similarly to experiment 4 except 3 atm ($3.040 \times 10^5$ Pa) of pressure. A calculated result of a stable oxygen permeation rate just 100 hours after the beginning of the experiment was found to be 25 cc/min/cm². At this time, reaction conversion rate of methane, CO selection rate (CO ratio in CO and $CO_2$), $H_2$/CO ratio were 76%, 95%, and 2.0, respectively. Change in quality of the material used, and significant carbon precipitation on the catalyst were not observed after the experiment.

Experiment 7 of the Third Invention (Production Experiment of Low-Pressure Synthetic Gas)

Precipitate consisting of magnesium component was created by adding a potassium carbonate aqueous solution to a magnesium nitrate aqueous solution. The precipitate was filtrated and washed. Then, the precipitate was dried for 12 hours or more at 120° C. in the air. Then, it was sintered for 2 hours at 1000° C. in the air and used for a catalyst support. Next, the catalyst support was immersed in a nickel nitrate aqueous solution to hold Ni. Subsequently, after the Ni-impregnated catalyst support was dried thoroughly in the air, it was sintered for 5 hours at 1000° C. in the air to obtain a catalyst (catalyst E) expressed by Ni 10 wt %/MgO. Then, the catalyst E was finely pulverized, and pressed under a pressure of 2 ton/cm² (about $1.96 \times 10^8$ Pa). Thereafter, the particle size was adjusted to 20/40 mesh to obtain the particle size adjusted catalyst B.

Similarly to experiment 1 except using the catalyst E instead of the catalyst A, a composite material D of catalyst and ceramics in which a methane reforming catalyst was firmly joined on the dense ceramic membrane surface was obtained. Then, 950 mg/cm₂ of the particle size adjusted catalyst B was filled on the methane reforming catalyst layer side of the composite material D of catalyst and ceramics disposed in an experimental apparatus similarly to experiment 4, and a production experiment of synthetic gas was carried out similarly to experiment 3 except that atmospheric pressure was applied as the pressure. A calculated result of a stable oxygen permeation rate just 100 hours after the beginning of the experiment was 22 cc/min/cm². At this time, reaction conversion rate of methane, CO selection rate (CO ratio in CO and $CO_2$), $H_2$/CO ratio were 77%, 97%, and 2.0, respectively. Change in quality of the material used, and significant carbon precipitation on the catalyst were not observed after the experiment.

Experiment 8 of the Third Invention (Production Experiment of Low-Pressure Synthetic Gas)

Ceramic material shown in Table 5 was produced in a manner similar to experiment 2 to obtain a composite material of catalyst and ceramics in which a methane reforming catalyst was firmly joined on the dense ceramic membrane surface was obtained similarly to that in experiment 7. Using this, a production experiment of synthetic gas was carried out in a manner similar to experiment 7. The result of calculating a stable oxygen permeation rate 100 hours after beginning of the experiment was shown in Table 5.

Comparison 3 of the Third Invention (Production Experiment of Low-Pressure Synthetic Gas)

A ceramic membrane containing a porous layer was obtained in a manner similar to experiment 1 except no application of slurry coat on a surface of the opposite side to the porous layer of ceramic membrane A with a methane reforming catalyst. Using this ceramic membrane, a production experiment of synthetic gas was carried out similarly to experiment 7. The result of calculating a stable oxygen permeation rate 100 hours after beginning of the experiment was 17 cc/min/cm². At this time, reaction conversion rate of methane, CO selection rate (CO ratio in CO and $CO_2$), $H_2$/CO ratio were 53%, 98%, and 2.0, respectively. Change in quality of the material used, and significant carbon precipitation on the catalyst were not observed after the experiment.

Comparison 4 of the Third Invention (Production Experiment of Low-Pressure Synthetic Gas)

A production experiment of synthetic gas was carried out similarly to experiment 4 except that atmospheric pressure was applied as the pressure. A calculated result of a stable oxygen permeation rate 100 hours after the beginning of the experiment was 8 cc/min/cm².

INDUSTRIAL APPLICABILITY

As described above in detail, according to the first invention, in a perovskite structure mixed conducting oxide, a ceramic composition high in the ratio of Ba in A site, a cubic perovskite structure being sufficiently stable, and showing a high oxygen permeation rate, can be realized. Further, the ceramic composition is applied in a technical field such as selective permeation of oxygen and separation process by a mixed conducting oxide or a partition membrane reactor for partial oxidation of hydrocarbon and the like so that excellent oxygen permeation characteristic can be displayed. jhe ceramic composition is also suitable for a dense continuous layer of a composite material used for oxygen-separation apparatus and the like, a porous substrate, or a catalyst. A technology provided by the first invention contributes greatly to make oxygen-separation apparatus from air and a partition membrane reactor high performance and low cost.

According to the second invention, a high performance partition membrane member to stably obtain a high oxygen permeation rate is obtained when an oxygen component in an oxygen-containing gas is selectively transferred. Accordingly, it is suitably used to a membrane reactor for synthetic gas production by partial oxidation of hydrocarbon and the like to contribute to make it compact leading to improve the performance and cost of the apparatus.

According to the third invention, synthetic gas can be produced with high energy efficiency, low cost, and long term stability, with oxygen-containing gas such as air and hydrocarbon-containing gas such as methane as raw material, using a partition membrane having a structure which integrates a dense oxygen selective permeation ceramic membrane and a methane reforming catalyst layer. It should be noted that as a gas containing raw material methane, recycle gas of natural gas, coalfield gas, coke-oven gas, or gas obtained by Fischer-Tropsch synthetic reaction, or, reforming gas of natural gas, coalfield gas, coke-oven gas, LPG, naphtha, gasoline, or kerosene can be used.

TABLE 1

| No | rba1 | XA | α | XB | 1-rc-rd-re-rf | XC | rc | |
|---|---|---|---|---|---|---|---|---|
| 1 | 0 | Sr | 1 | Co | 0.9 | In | 0.1 | Comparison |
| 2 | 0.4 | Sr | 1 | Co | 0.9 | In | 0.1 | Experiment |
| 3 | 0.6 | Sr | 1 | Co | 0.9 | In | 0.1 | Experiment |
| 4 | 0.8 | Sr | 1 | Co | 0.9 | In | 0.1 | Experiment |
| 5 | 0.9 | Sr | 1 | Co | 0.9 | In | 0.1 | Experiment |
| 6 | 1 | — | 1 | Co | 0.9 | In | 0.1 | Experiment |
| 7 | 1 | — | 1 | Co | 1 | — | 0 | Comparison |
| 8 | 1 | — | 1 | Co | 0.98 | In | 0.02 | Experiment |
| 9 | 1 | — | 1 | Co | 0.95 | In | 0.05 | Experiment |
| 10 | 1 | — | 1 | Co | 0.9 | In | 0.2 | Experiment |
| 11 | 0 | Sr | 1 | Co | 0.8 | Y | 0.1 | Comparison |
| 12 | 0.5 | Sr | 1 | Co | 0.9 | Y | 0.1 | Experiment |
| 13 | 0.6 | Sr | 1 | Co | 0.9 | Y | 0.1 | Experiment |
| 14 | 0.8 | Sr | 1 | Co | 0.9 | Y | 0.1 | Experiment |
| 15 | 0.9 | Sr | 1 | Co | 0.9 | Y | 0.1 | Experiment |
| 16 | 1 | — | 1 | Co | 0.9 | Y | 0.1 | Experiment |
| 17 | 0.9 | Sr | 1 | Co0.8Fe0.14 | 0.94 | Y | 0.06 | Experiment |
| 18 | 0.9 | Sr | 1 | Co0.8Fe0.1 | 0.9 | Y | 0.1 | Experiment |
| 19 | 0.9 | Sr | 1 | Co0.7Fe0.1 | 0.8 | Y | 0.2 | Experiment |
| 20 | 0 | sr | 1 | Co | 0.9 | Sn | 0.1 | Comparison |
| 21 | 0.2 | Sr | 1 | Co | 0.9 | Sn | 0.1 | Experiment |
| 22 | 0.5 | Sr | 1 | Co | 0.9 | Sn | 0.1 | Experiment |
| 23 | 0.8 | Sr | 1 | Co | 0.9 | Sn | 0.1 | Experiment |
| 24 | 0.9 | Sr | 1 | Co | 0.9 | Sn | 0.1 | Experiment |
| 25 | 1 | — | 1 | Co | 0.9 | Sn | 0.1 | Experiment |

| No | XD | rd | XE | re | XF | rf | Component Phase | Oxygen Permeation Rate | |
|---|---|---|---|---|---|---|---|---|---|
| 1 | — | 0 | — | 0 | — | 0 | X | Leak occurs | Comparison |
| 2 | — | 0 | — | 0 | — | 0 | ○ | 1 | Experiment |
| 3 | — | 0 | — | 0 | — | 0 | ○ | 3 | Experiment |
| 4 | — | 0 | — | 0 | — | 0 | ○ | 3 | Experiment |
| 5 | — | 0 | — | 0 | — | 0 | ○ | 4.5 | Experiment |
| 6 | — | 0 | — | 0 | — | 0 | ○ | 4.3 | Experiment |
| 7 | — | 0 | — | 0 | — | 0 | X | impossible to measure | Comparison |
| 8 | — | 0 | — | 0 | — | 0 | ○ | 1 | Experiment |
| 9 | — | 0 | — | 0 | — | 0 | ○ | 4 | Experiment |
| 10 | — | 0 | — | 0 | — | 0 | ○ | 2.5 | Experiment |
| 11 | — | 0 | — | 0 | — | 0 | X | impossible to measure | Comparison |
| 12 | — | 0 | — | 0 | — | 0 | ○ | 1 | Experiment |
| 13 | — | 0 | — | 0 | — | 0 | ○ | 2.5 | Experiment |
| 14 | — | 0 | — | 0 | — | 0 | ○ | 3.5 | Experiment |
| 15 | — | 0 | — | 0 | — | 0 | ○ | 3.6 | Experiment |
| 16 | — | 0 | — | 0 | — | 0 | ○ | 3.5 | Experiment |
| 17 | — | 0 | — | 0 | — | 0 | ○ | 3.3 | Experiment |
| 18 | — | 0 | — | 0 | — | 0 | ○ | 2.5 | Experiment |
| 19 | — | 0 | — | 0 | — | 0 | ○ | 1 | Experiment |
| 20 | — | 0 | — | 0 | — | 0 | X | Leak occurs | Comparison |
| 21 | — | 0 | — | 0 | — | 0 | ○ | 1 | Experiment |
| 22 | — | 0 | — | 0 | — | 0 | ○ | 2.5 | Experiment |
| 23 | — | 0 | — | 0 | — | 0 | ○ | 3.8 | Experiment |
| 24 | — | 0 | — | 0 | — | 0 | ○ | 3.3 | Experiment |
| 25 | — | 0 | — | 0 | — | 0 | ○ | 3 | Experiment |

TABLE 2

| No | rba1 | XA | α | XB | 1-rc-rd-re-rf | XC | rc | |
|---|---|---|---|---|---|---|---|---|
| 26 | 0.8 | Sr | 0.98 | Co | 0.9 | Sn | 0.1 | Experiment |
| 27 | 0.8 | Sr | 0.95 | Co | 0.9 | Sn | 0.1 | Experiment |
| 28 | 0.8 | Sr | 1.02 | Co | 0.9 | Sn | 0.1 | Experiment |
| 29 | 0.8 | Sr | 1.05 | Co | 0.9 | Sn | 0.1 | Experiment |
| 30 | 1 | — | 1 | Co0.85Fe0.05 | 0.9 | In | 0.1 | Experiment |
| 31 | 1 | — | 1 | Co0.8Fe0.1 | 0.9 | Sn | 0.1 | Experiment |
| 32 | 1 | — | 1 | Co0.75Fe0.1 | 0.85 | In0.1Y0.05 | 0.15 | Experiment |
| 33 | 0.6 | Sr | 1 | Co0.75Fe0.1 | 0.85 | In0.1Sn0.05 | 0.15 | Experiment |
| 34 | 0.2 | Sr | 1 | Co0.78Fe0.1 | 0.88 | Sn0.01In0.02 | 0.12 | Experiment |
| 35 | 0 | Sr | 1 | Co0.7Fe0.1 | 0.8 | In0.1Y0.1 | 0.2 | Comparison |
| 36 | 0.9 | Sr | 1 | Co | 0.85 | In | 0.1 | Experiment |

TABLE 2-continued

| No | | | | | | | |
|---|---|---|---|---|---|---|---|
| 37 | 0.9 | Sr | 1 | Co | 0.8 | In | 0.1 | Experiment |
| 38 | 0.9 | Sr | 1 | Co | 0.7 | In | 0.1 | Experiment |
| 39 | 0.9 | Sr | 1 | Co | 0.7 | In | 0.1 | Experiment |
| 40 | 0.9 | Sr | 1 | Co | 0.85 | In | 0.1 | Experiment |
| 41 | 0.9 | Sr | 1 | Co | 0.7 | In | 0.1 | Experiment |
| 42 | 0.9 | La | 1 | Co | 0.85 | In | 0.1 | Experiment |
| 43 | 0.9 | La | 1 | Co | 0.85 | In | 0.1 | Experiment |
| 44 | 0.9 | La | 1 | Co | 0.85 | In | 0.1 | Experiment |
| 45 | 0.9 | La | 1 | Co | 0.85 | In | 0.1 | Experiment |
| 46 | 0.8 | Sr | 1 | Co | 0.8 | Y | 0.1 | Experiment |
| 47 | 0.8 | Sr | 1 | Co | 0.8 | Y | 0.1 | Experiment |
| 48 | 0.8 | Ca | 1 | Co | 0.7 | Y | 0.1 | Experiment |

| No | XD | rd | XE | re | XF | rf | Component Phase | Oxygen Permeation Rate | |
|---|---|---|---|---|---|---|---|---|---|
| 26 | — | 0 | — | 0 | — | 0 | ○ | 3.1 | Experiment |
| 27 | — | 0 | — | 0 | — | 0 | ○ | 2 | Experiment |
| 28 | — | 0 | — | 0 | — | 0 | ○ | 2.3 | Experiment |
| 29 | — | 0 | — | 0 | — | 0 | ○ | 1.5 | Experiment |
| 30 | — | 0 | — | 0 | — | 0 | ○ | 3 | Experiment |
| 31 | — | 0 | — | 0 | — | 0 | ○ | 2.5 | Experiment |
| 32 | — | 0 | — | 0 | — | 0 | ○ | 2.5 | Experiment |
| 33 | — | 0 | — | 0 | — | 0 | ○ | 2.5 | Experiment |
| 34 | — | 0 | — | 0 | — | 0 | ○ | 1 | Experiment |
| 35 | — | 0 | — | 0 | — | 0 | X | 0.1 | Comparison |
| 36 | Nb | 0.05 | — | 0 | — | 0 | ○ | 3.5 | Experiment |
| 37 | Ta | 0.1 | — | 0 | — | 0 | ○ | 2.6 | Experiment |
| 38 | Ti | 0.2 | — | 0 | — | 0 | ○ | 1 | Experiment |
| 39 | Zr | 0.2 | — | 0 | — | 0 | ○ | 1.2 | Experiment |
| 40 | — | 0 | Cu | 0.05 | — | 0 | ○ | 2.8 | Experiment |
| 41 | Ta | 0.1 | Cu | 0.1 | — | 0 | ○ | 2 | Experiment |
| 42 | — | 0 | Ni | 0.05 | — | 0 | ○ | 2.6 | Experiment |
| 43 | — | 0 | Zn | 0.05 | — | 0 | ○ | 2 | Experiment |
| 44 | — | 0 | Li | 0.05 | — | 0 | ○ | 1.7 | Experiment |
| 45 | — | 0 | Mg | 0.05 | — | 0 | ○ | 2 | Experiment |
| 46 | — | 0 | — | 0 | Al | 0.1 | ○ | 2.5 | Experiment |
| 47 | — | 0 | — | 0 | Ga | 0.1 | ○ | 2.5 | Experiment |
| 48 | — | 0 | — | 0 | Cr | 0.2 | ○ | 1 | Experiment |

TABLE 3

| No. | Porous Catalyst Trash Material | Dense Continuous Layer Material | Porous Intermediate Catalytic Material | Porous Reactive Catalyst layer Active Metal* |
|---|---|---|---|---|
| 01 | $SrCo_{0.91}Nb_{0.1}O_{3-\delta}$ | $Ba_{0.5}Sr_{0.5}Co_{0.8}Fe_{0.2}O_{3-\delta}$ | $Y_{0.01}Sr_{0.99}Fe_{0.9}Nb_{0.1}O_{3-\delta}$ | Ru |
| 02 | $Ba_{0.6}Sr_{0.4}Co_{0.8}Fe_{0.2}O_{3-\delta}$ | $SrCo_{0.9}Nb_{0.1}O_{3-\delta}$ | $SrFe_{0.82}Co_{0.08}Ta_{0.1}O_{3-\delta}$ | Ru + Co + Rh |
| 03 | $SrCo_{0.9}Ta_{0.1}O_{3-\delta}$ | $Ba_{0.6}Sr_{0.4}Co_{0.8}Fe_{0.1}Ta_{0.1}O_{3-\delta}$ | $SrFe_{0.82}Co_{0.08}Ta_{0.09}Ti_{0.05}Zr_{0.05}O_{3-\delta}$ | Ru + Pd |
| 04 | $Ba_{0.6}Sr_{0.4}Co_{0.76}Fe_{0.05}Ta_{0.1}Ti_{0.05}Zr_{0.05}O_{3-\delta}$ | $Ba_{0.5}Sr_{0.5}Co_{0.8}Fe_{0.2}O_{3-\delta}$ | $Ba_{0.09}Ca_{0.01}Sr_{0.9}Fe_{0.87}Nb_{0.1}Zn_{0.01}Li_{0.01}Mg_{0.01}O_{3-\delta}$ | Ru + Ni + Pt |
| 05 | $SrCo_{0.91}Nb_{0.1}O_{3-\delta}$ | $SrCo_{0.9}Nb_{0.1}O_{3-\delta}$ | $La_{0.05}Sr_{0.95}Fe_{0.8}Ga_{0.05}Cr_{0.05}Nb_{0.1}O_{3-\delta}$ | Ni |
| 06 | $SrCo_{0.91}Nb_{0.1}O_{3-\delta}$ | $SrCo_{0.9}Nb_{0.1}O_{3-\delta}$ | $BaFe_{0.7}Y_{0.2}Nb_{0.1}O_{3-\delta}$ | Ru + Ir |
| 07 | $SrCo_{0.91}Nb_{0.1}O_{3-\delta}$ | $SrCo_{0.9}Nb_{0.1}O_{3-\delta}$ | $BaFe_{0.8}Y_{0.1}Ti_{0.1}O_{3-\delta}$ | Ru + Re |

(*All catalyst carriers are MgO)

TABLE 4

| No. | Ceramic Membrane | Methane Reforming Catalyst |
|---|---|---|
| 01 | Ceramic Membrane A | Catalyst B |
| 02 | Ceramic Membrane B | Catalyst B |
| 03 | Ceramic Membrane C | Catalyst A |
| 04 | Ceramic Membrane C | Catalyst B |
| 05 | Ceramic Membrane C | Catalyst C |
| 06 | Ceramic Membrane D | Catalyst A |
| 07 | Ceramic Membrane D | Catalyst B |
| 08 | Ceramic Membrane D | Catalyst C |

TABLE 5

| No. | Ceramic Membrane Material | Oxygen Permeation Rate (cc/min/cm²) |
|---|---|---|
| 01 | $BaCO_{0.7}Fe_{0.2}In_{0.1}O_{3-\delta}$ | 22 |
| 02 | $BaCo_{0.7}Fe_{0.2}Y_{0.1}O_{3-\delta}$ | 21 |
| 03 | $BaCo_{0.7}Fe_{0.2}Y_{0.05}O_{3-\delta}$ | 21 |

What is claimed is:

1. A ceramic composition of mixed conducting oxide having substantially a perovskite structure, said ceramic composition containing:
   Ba;
   at least one kind of element selected from a first group consisting of Co and Fe;
   at least one kind of element selected from a second group consisting of In, Sn and Y,
   wherein an element selected from the second group is arranged in B site in the perovskite structure.

2. A ceramic composition of mixed conducting oxide having substantially a perovskite structure, expressed by the following composition formula (formula 1):

$$(Ba_{rba1}XA_{1-rba1})_\alpha(XB_{1-re-rd-re-rf}XC_{re}XD_{rd}XE_{re}XF_{rf})O_{3-\delta} \qquad \text{formula 1}$$

where XA denotes at least one kind of element selected from a third group consisting of Sr, Ca and lanthanide;

XB denotes at least one kind of element selected from a first group consisting of Co and Fe;

XC denotes at least one kind of element selected from a second group consisting of In, Y, and Sn;

XD denotes at least one kind of element selected from a fourth group consisting of Nb, Ta, Ti, and Zr;

XE denotes at least one kind of element selected from a fifth group consisting of Cu, Ni, Zn, Li and Mg; and XF denotes at least one kind of element selected from a sixth group consisting of Cr, Ga, and Al, as for the range of rba1, when XC contains only In, it fulfills the condition of $0.4 \leq rba1 \leq 1.0$;

when XC contains only Y, it fulfills the condition of $0.5 \leq rba1 \leq 1.0$;

when XC contains only Sn, it fulfills the condition of $0.2 \leq rba1 \leq 1.0$; and when XC contains two or more elements composing the second group, it fulfills the condition of $0.2 \leq rba1 \leq 1.0$, as for the range of rc, when XC contains only Y, it fulfills the condition of $0.06 \leq rc \leq 03$;

when XC contains at least any one of In or Sn, it fulfills the condition of $0.02 \leq rc \leq 0.3$;

the range of rd fulfills the condition of $0 \leq rd \leq 0.2$;

the range of re fulfills the condition of $0 \leq re \leq 0.2$;

the range of rf fulfills the condition of $0 \leq rf \leq 0.2$;

the range of $\alpha$ fulfills the condition of $0.9 \leq \alpha \leq 1.1$, and $\delta$ is a value determined to fulfill the condition of neutral electric charge.

3. The ceramic composition according to claim 2, wherein the values of re and rf in said composition formula (formula 1) are both zero.

4. The ceramic composition according to claim 3, wherein rd in said composition formula (formula 1) is zero.

5. A composite material of catalyst and ceramics, comprising:

a selective oxygen-permeable dense continuous layer containing mixed conducting oxide;

a porous intermediate catalyst layer contiguous to a first surface of said dense continuous layer and containing mixed conducting oxide;

a porous reactive catalyst layer contiguous to said porous intermediate catalyst layer in a manner to sandwich said porous intermediate catalyst layer with said dense continuous layer, and containing a metal catalyst and a catalyst support; and a porous catalyst layer contiguous to a second surface of said dense continuous layer and containing mixed conducting oxide.

6. The composite material of catalyst and ceramics according to claim 5, comprising:

a multi-layered structure including said porous catalyst layer, said dense continuous layer, said porous intermediate catalyst layer, and said porous reactive catalyst layer; and a porous substrate supporting said multi-layered structure.

7. The composite material of catalyst and ceramics according to claim 5, wherein the composition of the mixed conducting oxide contained in at least one layer selected from a group consisting of said dense continuous layer, said porous catalyst layer and said porous intermediate catalyst layer is expressed by the following composition formula (formula 2):

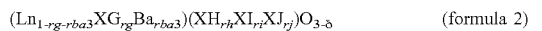
$$(Ln_{1-rg-rba3}XG_{rg}Ba_{rba3})(XH_{rh}XI_{ri}XJ_{rj})O_{3-\delta}$$ (formula 2)

(where Ln denotes at least one kind of element selected from lanthanide;

XG denotes at least one kind of element selected from a seventh group consisting of Sr and Ca;

XH denotes at least one kind of element selected from an eighth group consisting of Co, Fe, Cr, and Ga, in which the sum total of the number of moles of Cr and Ga is 0 to 20% to the sum total of the number of moles of the elements composing the above-described eighth group;

XI denotes at least one kind of element selected from a ninth group consisting of Nb, Ta, Ti, Zr, In and Y, including, at least one kind of element selected from a tenth group consisting of Nb, Ta, In, and Y; and XJ denotes at least one kind of element selected from an eleventh group consisting of Zn, Li and Mg, as for the range of rba3:

when XI contains only In, it fulfills the condition of $0.4 \leq rba3 \leq 1.0$;

when XI contains only Y, it fulfills the condition of $0.5 \leq rba3 \leq 1.0$; and when XI contains only In and Y, it fulfills the condition of $0.2 \leq rba3 \leq 1.0$, the range of "rg+rba3" fulfills the condition of $0.8 \leq rg+rba3 \leq 1$, the range of rh fulfills the condition of $0 \leq rh$, the range of ri fulfills the condition of $0 \leq ri \leq 0.5$, the range of rj fulfills the condition of $0 \leq rj \leq 0.2$, and the range of "rh+ri+rj" fulfills $0.98 \leq rh+ri+rj \leq 1.02$, and $\delta$ is a value determined to fulfill the condition of neutral electric charge.

8. The composite material of catalyst and ceramics according to claim 7, wherein a composition of mixed conducting oxide composing at least one layer selected from a group consisting of said dense continuous layer and said porous catalyst layer is expressed by the composition formula (formula 2); and wherein said porous intermediate catalyst layer contains at least one kind of element selected from a twelfth group consisting of Co, Fe, Mn, and Pd.

9. The composite material of catalyst and ceramics according to claim 5, wherein porosity of said porous catalyst layer and said porous intermediate catalyst layer is 20 to 80%, the thickness of said dense continuous layer is 1 µm to 2 mm, said catalyst support contains MgO, and said metal catalyst uses at least one kind of element selected from a thirteenth group consisting of Ni, Co, Ru, Rh, Pt, Pd, Ir and Re as an active metal kind.

10. The composite material of catalyst and ceramics according to claim 5, wherein said porous intermediate catalyst layer is formed by sintering a material particle of 10 µm or less in particle diameter on said dense continuous layer at 950° C. or more; and wherein said porous reactive catalyst layer is formed by sintering a material particle of 10 µm or less in particle diameter on said porous intermediate catalyst layer at 950° C. or more.

11. A membrane reactor, comprising the composite material of catalyst and ceramics according to claim 5.

12. A composite material of catalyst and ceramics comprising:

a dense ceramic membrane of which composition is expressed by the following composition formula (formula 2), containing mixed conducting oxide having a perovskite structure; and a catalyst portion contiguous to a first surface of said dense ceramic membrane and containing magnesia and Ni, wherein (formula 2) is defined by:

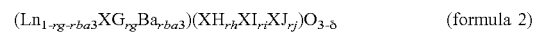
$$(Ln_{1-rg-rba3}XG_{rg}Ba_{rba3})(XH_{rh}XI_{ri}XJ_{rj})O_{3-\delta}$$ (formula 2)

(where Ln denotes at least one kind of element selected from lanthanide;

XG denotes at least one kind of element selected from a seventh group consisting of Sr and Ca;

XH denotes at least one kind of element selected from an eighth group consisting of Co, Fe, Cr, and Ga, in which the sum total of the number of moles of Cr and Ga is 0 to 20% to the sum total of the number of moles of the elements composing the above-described eighth group;

XI denotes at least one kind of element selected from the ninth group consisting of Nb, Ta, Ti, Zr, In and Y, including at least one kind of element selected from the tenth group consisting of Nb, Ta, In, and Y; and XJ denotes at least one kind of element selected from an eleventh group consisting of Zn, Li and Mg, as for the range of rba3:

when XI contains only In, it fulfills the condition of $0.4 \leq rba3 \leq 1.0$;

when XI contains only Y, it fulfills the condition of $0.5 \leq rba3 \leq 1.0$; and when XI contains only In and Y, it fulfills the condition of $0.2 \leq rba3 \leq 1.0$, the range of "rg+rba3" fulfills the condition of $0.8 \leq rg+rba3 \leq 1$, the range of rh fulfills the condition of $0 \leq rh$, the range of ri fulfills the condition of $0 \leq ri \leq 0.5$, the range of rj fulfills the condition of $0 \leq rj \leq 0.2$, and the range of "rh+ri+rj" fulfills $0.98 \leq rh+ri+rj \leq 1.02$, and δ is a value determined to fulfill the condition of neutral electric charge.

13. The composite material of catalyst and ceramics according to claim 12, comprising:

a porous layer being contiguous to a second surface of said dense ceramic membrane, and including mixed conducting oxide having a perovskite structure, wherein the composition of said porous layer is expressed by the composition formula (formula 2).

14. The composite material of catalyst and ceramics according to claim 13, wherein the porosity of said porous layer is 20 to 80%, and the thickness of said porous layer is 0.001 to 5 mm.

15. The composite material of catalyst and ceramics according to claim 13, comprising;

a multi-layered structure provided with said porous layer, said dense ceramic membrane and said catalyst portion; and a porous substrate supporting said multi-layered structure.

16. The composite material of catalyst and ceramics according to claim 12, wherein the value of rba3 in the composition formula (formula 2) is 1.0.

17. The composite material of catalyst and ceramics according to claim 12, wherein said catalyst portion contains a composition expressed by the following composition formula (formula 6):

$$Ni_{mi}M_{rmn}Mg_{1-mi-rmn}O_c \quad \text{(formula 6)}$$

(wherein the range of mi fulfills the condition of $0 < mi \leq 0.4$ while the range of rmn fulfills the condition of $0 \leq rmn \leq 0.1$, and c is a value determined to fulfill the condition of neutral electric charge.

18. The composite material of catalyst and ceramics according to claim 17, wherein said catalyst portion contains at least one kind of element selected from a fourteenth group consisting of Ru, Rh, Pd, Re, Os, Ir, and Pt.

19. The composite material of catalyst and ceramics according to claim 12, wherein said catalyst portion contains magnesia, Ni, and Mn.

20. The composite material of catalyst and ceramics according to claim 19, wherein said catalyst portion contains at least one kind of element selected from the fourteenth group consisting of Ru, Rh, Pd, Re, Os, Ir, and Pt.

21. The composite material of catalyst and ceramics according to claim 12, wherein said catalyst portion contains composite oxide expressed by the composition formula (formula 2).

22. The composite material of catalyst and ceramics according to claim 12, comprising:

a multi-layered structure provided with said dense ceramic membrane and said catalyst portion; and a porous substrate supporting said multi-layered structure.

23. The composite material of catalyst and ceramics according to claim 12, wherein said catalyst portion includes a porous layer having an average pore diameter of 10 μm or less, and thickness of 0.01 to 1 mm.

24. The composite material of catalyst and ceramics according to claim 12, comprising:

a reforming catalyst portion contiguous to said catalyst portion in a manner to sandwich said catalyst portion between said dense ceramic membrane and the reforming catalyst portion, and adjusted in particle size to be 0.5 mm or more.

25. The composite material of catalyst and ceramics according to claim 24, wherein said reforming catalyst portion contains a composition expressed by the following composition formula (formula 6):

$$Ni_{mi}Mn_{rmn}Mg_{1-mi-rmn}O_c \quad \text{(formula 6)}$$

wherein the range of mi fulfills the condition of $0 < rni \leq 0.4$ while the range of rmn fulfills the condition of $0 \leq rmn \leq 0.1$, and c is a value determined to fulfill the condition of neutral electric charge.

26. The composite material of catalyst and ceramics according to claim 25, wherein said reforming catalyst portion contains at least one kind of element selected from the fourteenth group consisting of Ru, Rh, Pd, Re, Os, Ir, and Pt.

27. The composite material of catalyst and ceramics according to claim 24, wherein said reforming catalyst portion contains magnesia, Ni, and Mn.

28. The composite material of catalyst and ceramics according to claim 27, wherein said reforming catalyst portion contains at least one kind of element selected from the fourteenth group consisting of Ru, Rh, Pd, Re, Os, Ir, and Pt.

29. The composite material of catalyst and ceramics according to claim 24, wherein said reforming catalyst portion contains at least one kind of element selected invariably containing Ni or Ru from the fifteenth group consisting of Ni, Ru, Rh, Pd, Re, Os, Ir and Pt.

30. The composite material of catalyst and ceramics according to claim 12, wherein the thickness of said dense ceramic membrane is 0.5 to 2 mm.

31. The composite material of catalyst and ceramics according to claim 25, comprising:

a reforming catalyst portion contiguous to said catalyst portion in a manner to sandwich said catalyst portion between said dense ceramic membrane and the reforming catalyst portion, and particle size adjusted to be 0.5 mm or more of the particle size.

32. A production method of synthetic gas, comprising the steps of:

making an atmosphere, to a membrane provided with a dense ceramic membrane and a catalyst portion contiguous to a first surface of said dense ceramic membrane, on said catalyst portion side of the partition membrane to be a hydrocarbon-containing gas atmosphere and on the dense ceramic membrane side to be an oxygen-containing gas atmosphere, wherein said dense ceramic membrane contains perovskite structured mixed conducting oxide of which composition is expressed by the following formula (formula 2); and said catalyst portion contains magnesia and Ni, wherein (formula 2) is defined by:

$$(Ln_{1-rg-rba3}XG_{rg}Ba_{rba3})(XH_{rh}XI_{ri}XJ_{rj})O_{3-\delta} \quad \text{(formula 2)}$$

where Ln denotes at least one kind of element selected from lanthanide;

XG denotes at least one kind of element selected from a seventh group consisting of Sr and Ca;

XH denotes at least one kind of element selected from an eighth group consisting of Co, Fe, Cr, and Ga, in which the sum total of the number of moles of Cr and Ga is 0 to 20% to the sum total of the number of moles of the elements composing the above-described eighth group;

XI denotes at least one kind of element selected from the ninth group consisting of Nb, Ta, Ti, Zr, In and Y, including, at least one kind of element selected from the tenth group consisting of Nb, Ta, In, and Y; and XJ denotes at least one kind of element selected from an eleventh group consisting of Zn, Li and Mg, as for the range of rba3:

when XI contains only In, it fulfills the condition of $0.4 \leq rba3 \leq 1.0$;

when XI contains only Y, it fulfills the condition of $0.5 \leq rba3 \leq 1.0$; and when XI contains only In and Y, it fulfills the condition of $0.2 \leq rba3 \leq 1.0$, the range of "rg+rba3" fulfills the condition of $0.8 \leq rg+rba3 \leq 1$, the range of rh fulfills the condition of $0 < rh$, the range of ri fulfills the condition of $0 < ri \leq 0.5$, the range of rj fulfills the condition of $0 \leq rj \leq 0.2$, and the range of "rh+ri+rj" fulfills $0.98 \leq rh+ri+rj \leq 1.02$, and $\delta$ is a value determined to fulfill the condition of neutral charge.

33. The production method of synthetic gas according to claim 32, wherein the step of making the atmosphere on the catalyst portion side of said partition membrane to be a hydrocarbon-containing atmosphere includes a step of making said catalyst portion side atmosphere to be a methane-containing gas atmosphere having a pressure of 0.3 MPa or more, wherein said catalyst portion includes a porous layer having an average pore size of 10 μm or less, and a thickness of 0.01 to 1 mm.

34. The production method of synthetic gas according to claim 32, wherein the step of making the atmosphere on the catalyst portion side of said partition membrane to be a hydrocarbon-containing gas atmosphere includes a step of making said catalyst portion side atmosphere to be a methane-containing gas atmosphere having a pressure of 0.5 MPa or less, wherein said catalyst portion includes a porous layer having an average pore size of 10 μm or less, and a thickness of 0.01 to 1 mm, wherein said partition membrane includes a reforming catalyst portion contiguous to said catalyst portion in a manner to sandwich said catalyst portion between said dense ceramic membrane and the reforming catalyst portion, and adjusted in particle size to be 0.5 mm or more.

35. The production method of synthetic gas according to claim 32, wherein the step of making the atmosphere on said catalyst portion side of the partition membrane to be a hydrocarbon-containing gas atmosphere, comprising the steps of:

making the atmosphere of said catalyst portion side to be a methane-containing gas atmosphere; and forcing water vapor to contain into the methane-containing gas from outside to adjust a ratio of concentration of the water vapor to methane to 2 or less.

36. The production method of synthetic gas according to claim 32, wherein said methane-containing gas includes:

one kind of recycle gas selected from a group consisting of natural gas, coalfield gas, coke-oven gas, and gas obtained by Fischer-Tropsch synthetic reaction, or, one kind of reforming gas selected from a group consisting of natural gas, coalfield gas, coke-oven gas, LPG, naphtha, gasoline, and kerosene.

37. A production apparatus of synthetic gas, comprising a partition membrane, said partition membrane having:

a dense ceramic membrane containing mixed conducting oxide of which composition is expressed by the following composition formula (formula 2), and having a perovskite structure; and a catalyst portion contiguous to a first surface of said dense ceramic membrane and containing magnesia and Ni, where (formula 2) is defined by:

$$(Ln_{1-rg-rba3}XG_{rg}Ba_{rba3})(XH_{rh}XI_{ri}XJ_{rj})O_{3-\delta} \quad \text{(formula 2)}$$

where Ln denotes at least one kind of element selected from lanthanide;

XG denotes at least one kind of element selected from a seventh group consisting of Sr and Ca;

XH denotes at least one kind of element selected from an eighth group consisting of Go, Fe, Cr, and Ga, in which the sum total of the number of moles of Cr and Ga is 0 to 20% to the sum total of the number of moles of the elements composing the above-described eighth group;

XI denotes at least one kind of element selected from the ninth group consisting of Nb, Ta, Ti, Zr, In and Y, including, at least one kind of element selected from the tenth group consisting of Nb, Ta, In, and Y; and XJ denotes at least one kind of element selected from an eleventh group consisting of Zn, Li and Mg, as for the range of rba3:

when XI contains only In, it fulfills the condition of $0.4 \leq rba3 \leq 1.0$;

when XI contains only Y, it fulfills the condition of $0.5 \leq rba3 \leq 1.0$; and when XI contains only In and Y, it fulfills the condition of $0.2 \leq rba3 \leq 1.0$, the range of "rg+rba3" fulfills the condition of $0.8 \leq rg+rba3 \leq 1$, the range of rh fulfills the condition of $0 < rh$, the range of ri fulfills the condition of $0 < ri \leq 0.5$ the range of rj fulfills the condition of $0 \leq rj \leq 0.2$, and the range of "rh+ri+rj" fulfills $0.98 \leq rh+ri+rj \leq 1.02$, and $\delta$ is a value determined to fulfill the condition of neutral electric charge.

* * * * *

UNITED STATES PATENT AND TRADEMARK OFFICE
CERTIFICATE OF CORRECTION

| | |
|---|---|
| PATENT NO. | : 7,151,067 B2 |
| APPLICATION NO. | : 10/492635 |
| DATED | : December 19, 2006 |
| INVENTOR(S) | : Tadashi Sakon et al. |

It is certified that error appears in the above-identified patent and that said Letters Patent is hereby corrected as shown below:

Column 44, line 35, change "$XF_{rf})$" to -- $XF_{rf})O_{3-\delta}$ --;

Column 46, line 3, change "including," to -- including --;

Column 47, line 53, change "$Ni_{mi}M_{rmn}Mg_{1-mi-rmn}O_c$" to -- $Ni_{rni}Mn_{rmn}Mg_{1-mi-rmn}O_c$ --;

Column 47, line 55, change "mi" to -- rni --;

Column 47, line 56, change "mi" to -- rni --;

Column 48, line 27, change "$Ni_{mi}Mn_{rmn}Mg_{1-mi-rmn}O_c$" to -- $Ni_{rni}Mn_{rmn}Mg_{1-rni-rmn}O_c$ --;

Column 48, line 29, change "mi," to -- rni --;

Column 48, line 55, change "claim 25" to -- claim 30 --;

Column 49, line 3, change "perovskite" to -- perov-skite --;

Column 49, line 22, change "including," to -- including --; and

Column 50, line 40, change "Go" to -- Co --.

Signed and Sealed this

Twenty-first Day of July, 2009

JOHN DOLL
*Acting Director of the United States Patent and Trademark Office*